United States Patent
Lee et al.

(10) Patent No.: US 10,534,483 B2
(45) Date of Patent: Jan. 14, 2020

(54) TOUCH PANEL

(71) Applicant: LG INNOTEK CO., LTD., Seoul (KR)

(72) Inventors: Jin Woong Lee, Seoul (KR); Byung Youl Moon, Seoul (KR); Jung Hwan Bang, Seoul (KR); Kwang Yong Jin, Seoul (KR); Yong Jae Choi, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 143 days.

(21) Appl. No.: 15/561,258

(22) PCT Filed: May 2, 2016

(86) PCT No.: PCT/KR2016/004584
§ 371 (c)(1),
(2) Date: Sep. 25, 2017

(87) PCT Pub. No.: WO2016/178498
PCT Pub. Date: Nov. 10, 2016

(65) Prior Publication Data
US 2018/0120971 A1 May 3, 2018

(30) Foreign Application Priority Data

May 4, 2015 (KR) .......... 10-2015-0062561
May 4, 2015 (KR) .......... 10-2015-0062562
(Continued)

(51) Int. Cl.
*G06F 3/044* (2006.01)
*G06F 3/0354* (2013.01)
(Continued)

(52) U.S. Cl.
CPC .......... *G06F 3/044* (2013.01); *G06F 3/03545* (2013.01); *G06F 3/045* (2013.01);
(Continued)

(58) Field of Classification Search
CPC ...... G06F 3/044; G06F 3/03545; G06F 3/045; G06F 3/046; G06F 3/047; G06F 2203/04112
See application file for complete search history.

(56) References Cited

U.S. PATENT DOCUMENTS

2012/0318585 A1* 12/2012 Kim .................. H05K 3/06
                                                178/18.03
2013/0162547 A1 6/2013 Yoo et al.
(Continued)

FOREIGN PATENT DOCUMENTS

JP   2003-136625   5/2003
JP   2008-084222   4/2008
(Continued)

OTHER PUBLICATIONS

International Search Report and Written Opinion dated Aug. 9, 2016 issued in Application No. PCT/KR2016/004584 (Full English Text).

*Primary Examiner* — Jimmy H Nguyen
(74) *Attorney, Agent, or Firm* — KED & Associates, LLP

(57) ABSTRACT

The present invention relates to a touch panel and, more particularly, to a touch panel capable of improving electrical conductive characteristics of the touch panel, reducing the size of the touch panel, improving the visibility of the touch panel, and minimizing damage to a substrate when a failure test is performed on the touch panel.

6 Claims, 19 Drawing Sheets

(30) Foreign Application Priority Data

May 4, 2015 (KR) ......................... 10-2015-0062563
May 7, 2015 (KR) ......................... 10-2015-0063745

(51) Int. Cl.
*G06F 3/045* (2006.01)
*G06F 3/047* (2006.01)
*G06F 3/046* (2006.01)

(52) U.S. Cl.
CPC .............. *G06F 3/046* (2013.01); *G06F 3/047* (2013.01); *G06F 2203/04112* (2013.01)

(56) References Cited

U.S. PATENT DOCUMENTS

| | | |
|---|---|---|
| 2013/0181937 A1 | 7/2013 | Chen et al. |
| 2014/0152917 A1 | 6/2014 | Lee et al. |
| 2014/0231120 A1* | 8/2014 | Nakamura .............. B32B 15/14 174/253 |

FOREIGN PATENT DOCUMENTS

| | | |
|---|---|---|
| KR | 10-0829482 | 5/2008 |
| KR | 10-1209514 | 12/2012 |
| KR | 10-2013-0116854 | 10/2013 |
| KR | 10-2014-0067488 | 6/2014 |
| KR | 10-2014-0071026 | 6/2014 |
| KR | 10-1451075 | 10/2014 |
| KR | 10-2015-0004579 | 1/2015 |
| KR | 10-2015-0006228 | 1/2015 |

* cited by examiner

[Fig. 1]
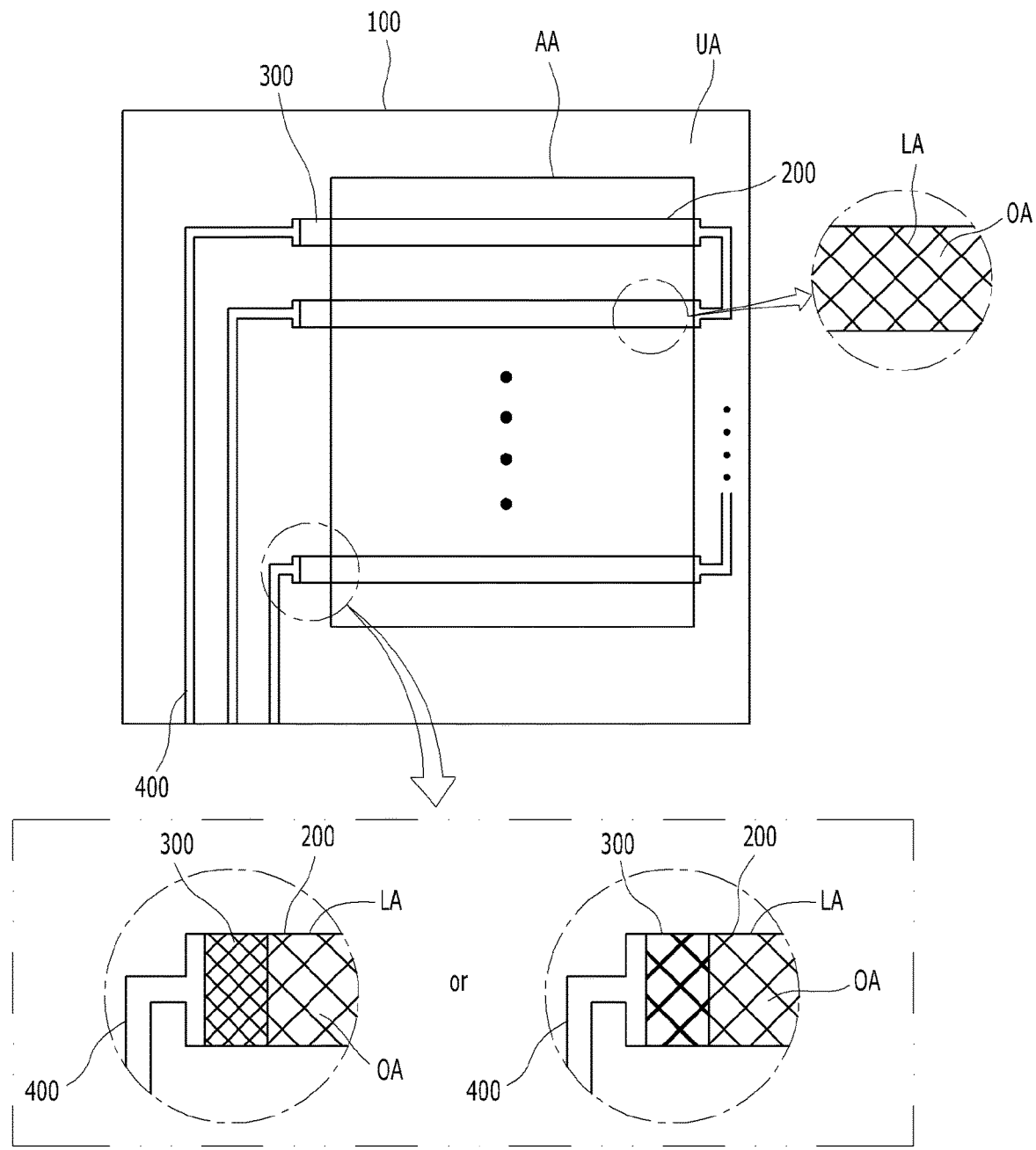

[Fig. 2]
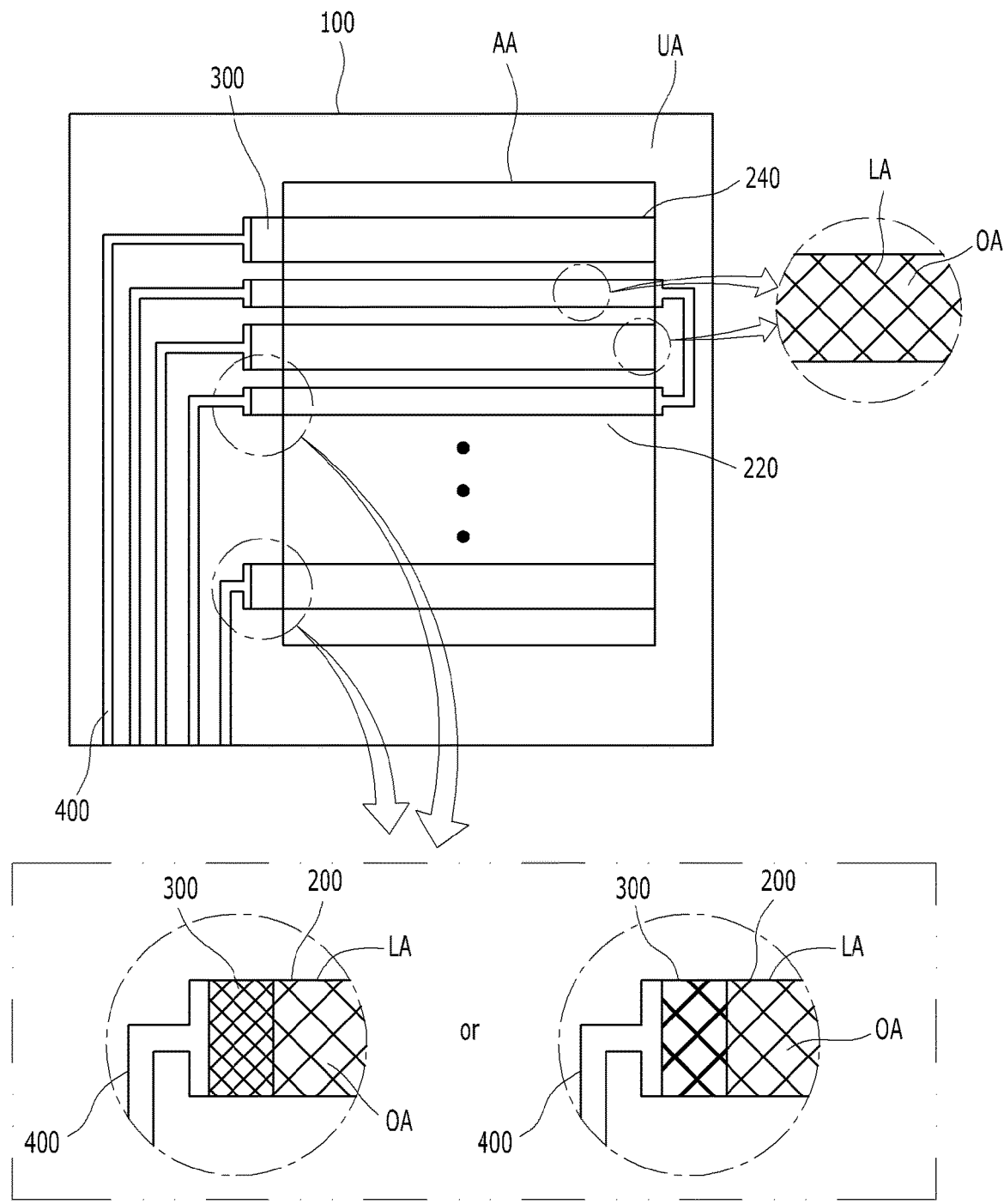

[Fig. 3]
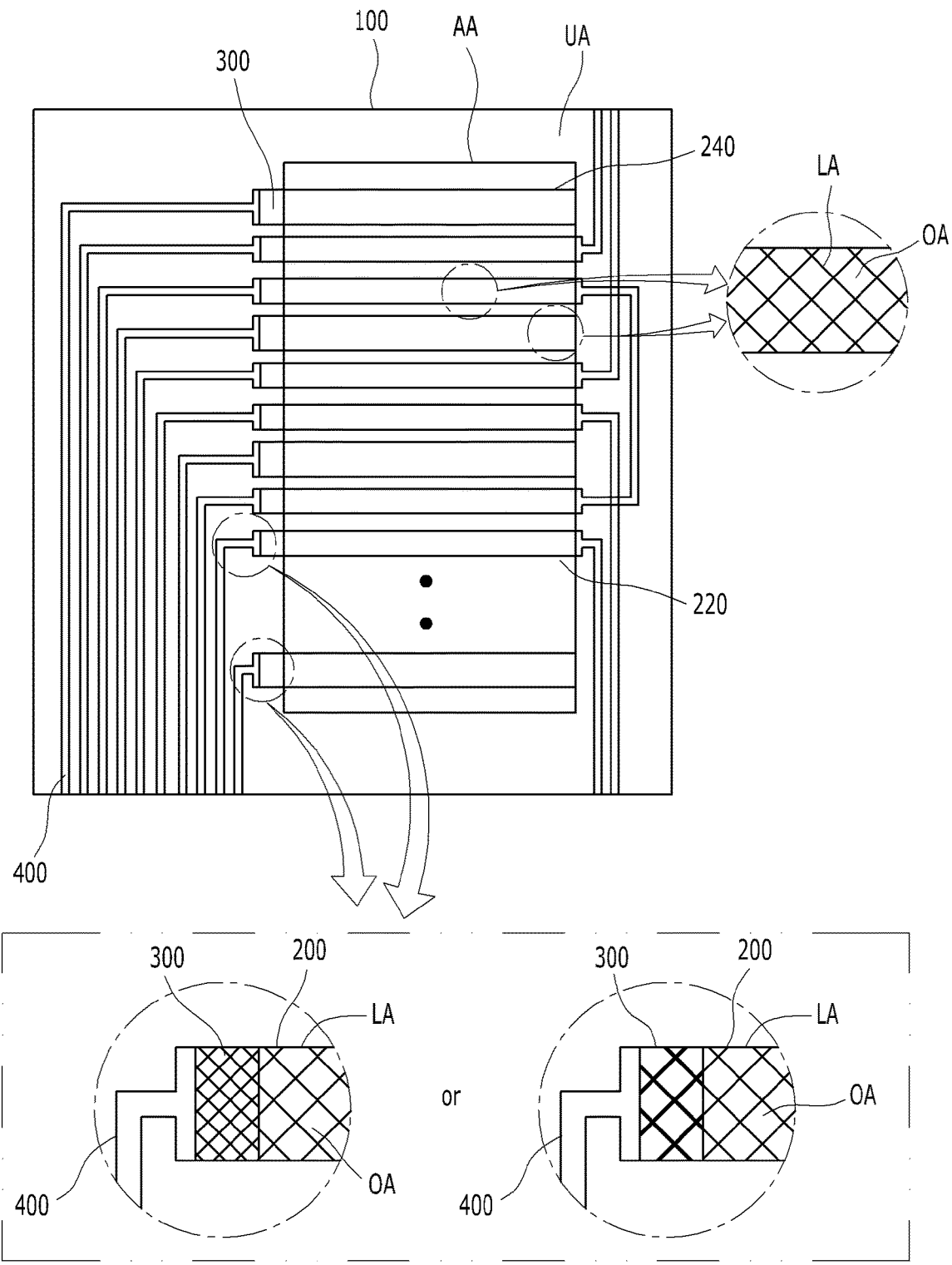

[Fig. 4]
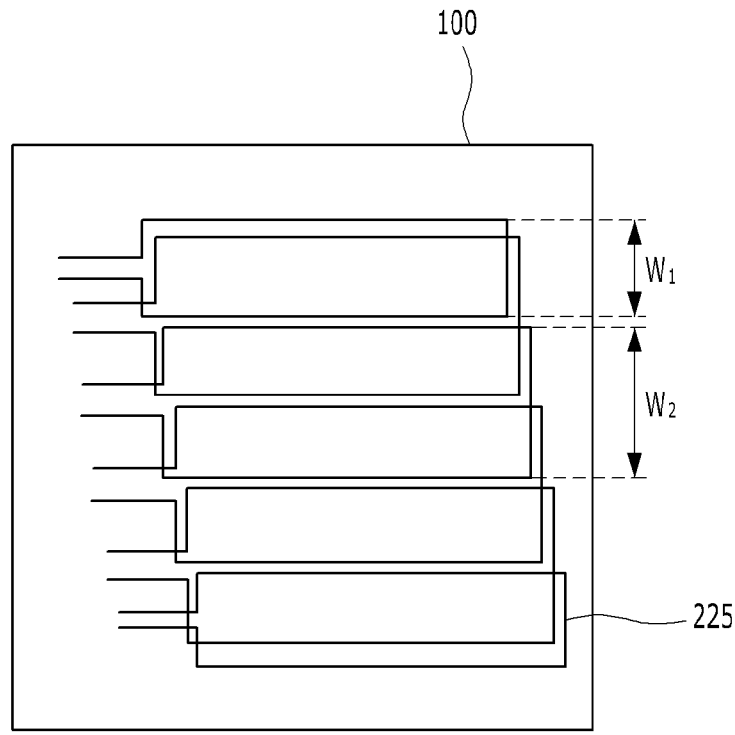
[Fig. 5]
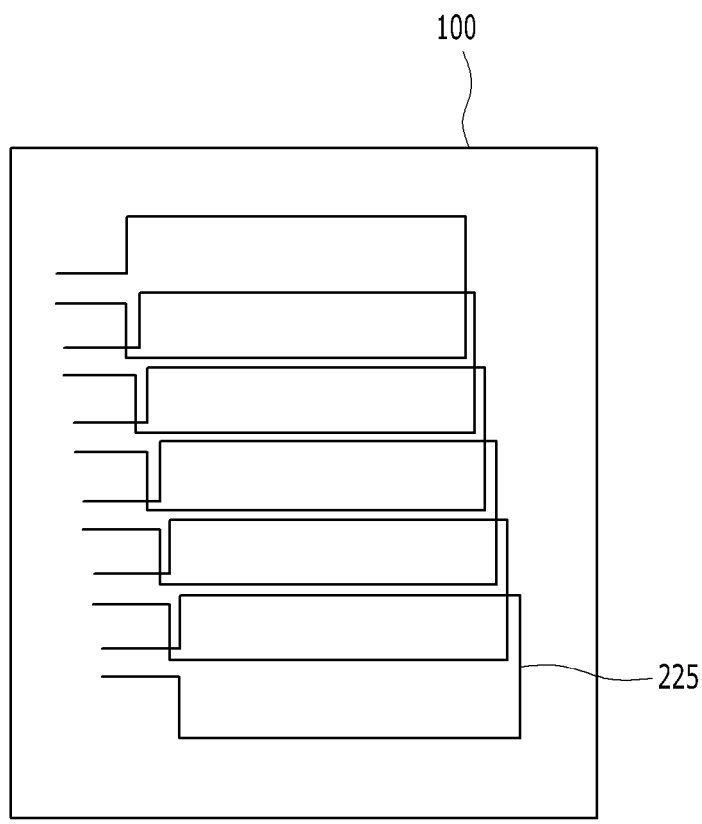

[Fig. 6]
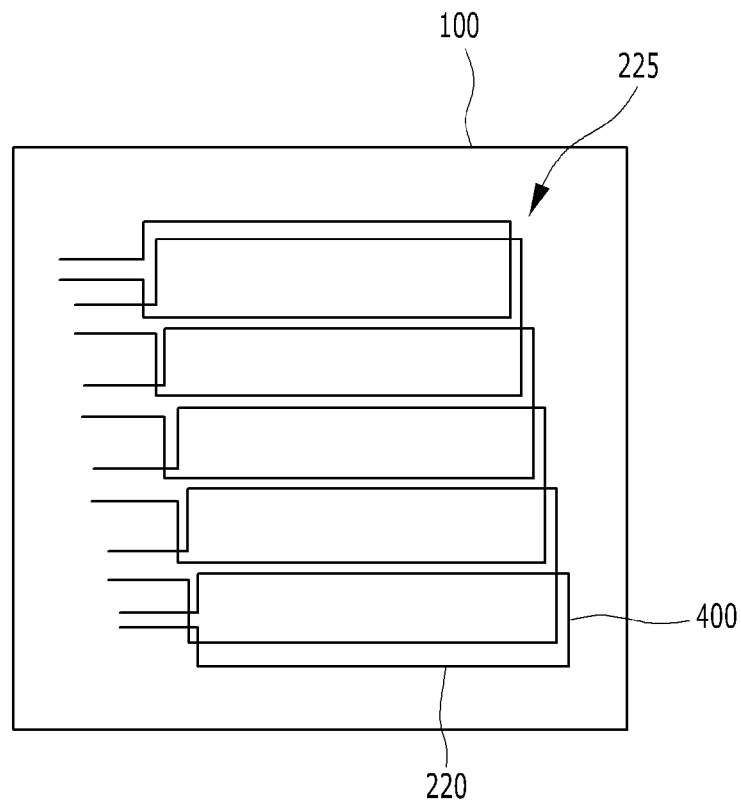
[Fig. 7]
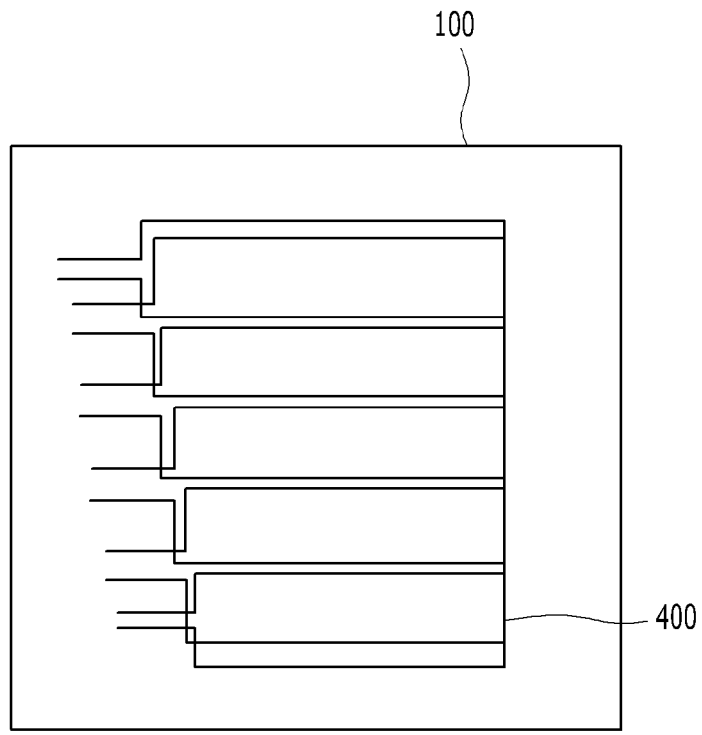

[Fig. 8]
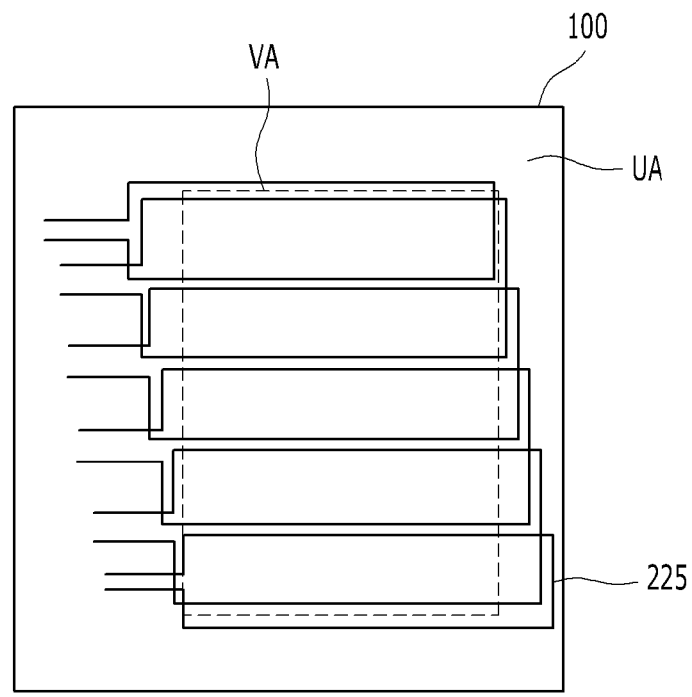
[Fig. 9]
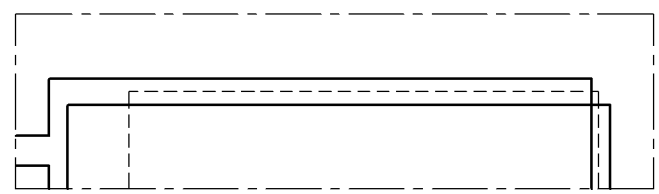
(a)
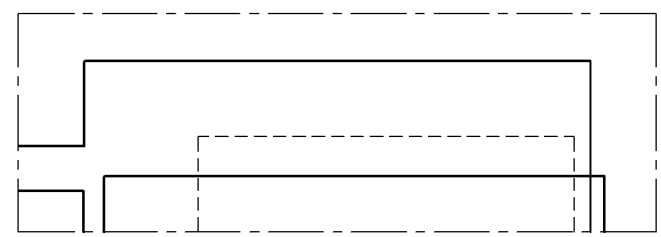
(b)

[Fig. 10]
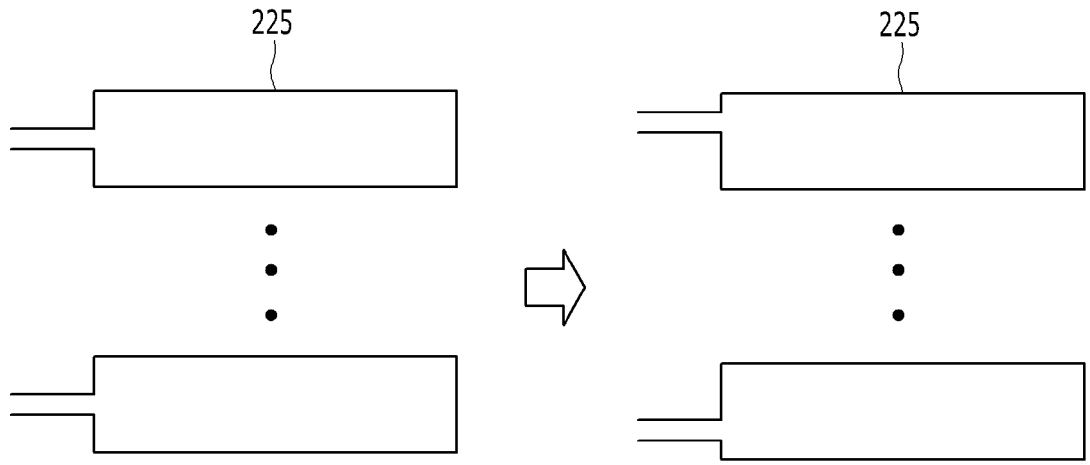
[Fig. 11]
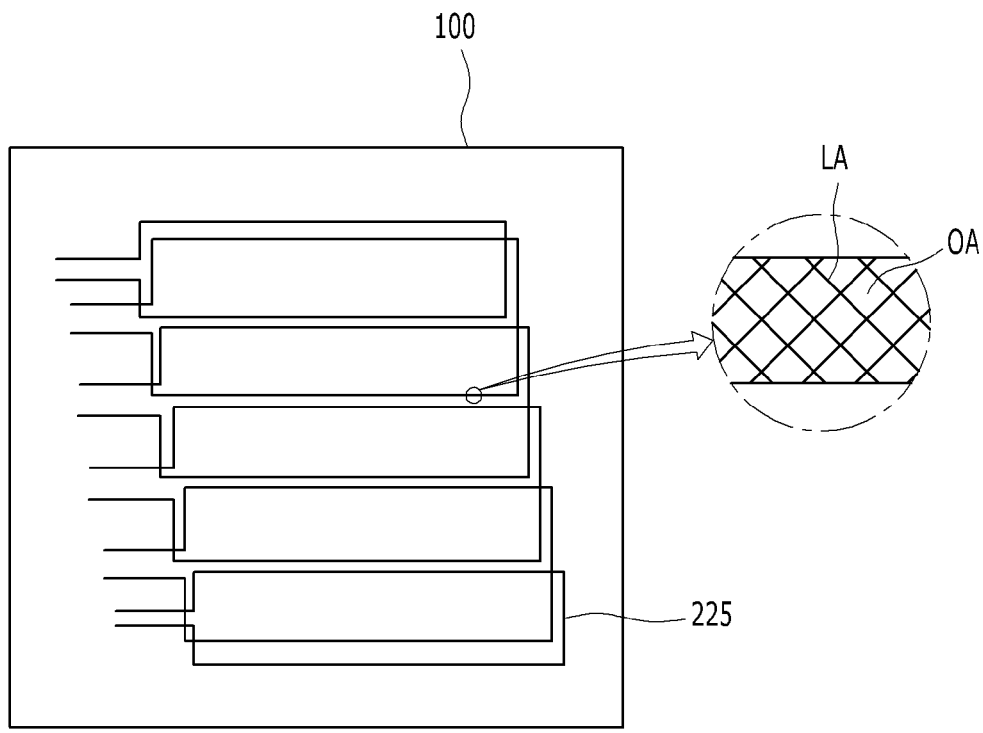
[Fig. 12]
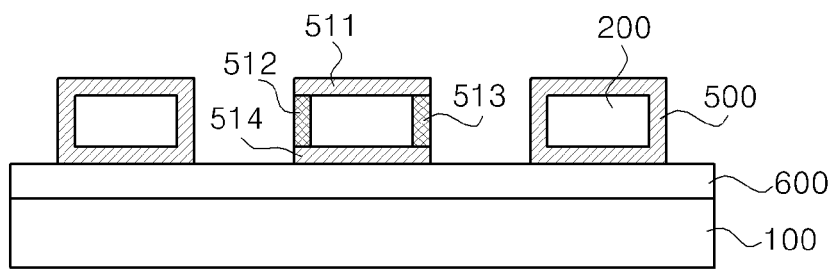

[Fig. 13]
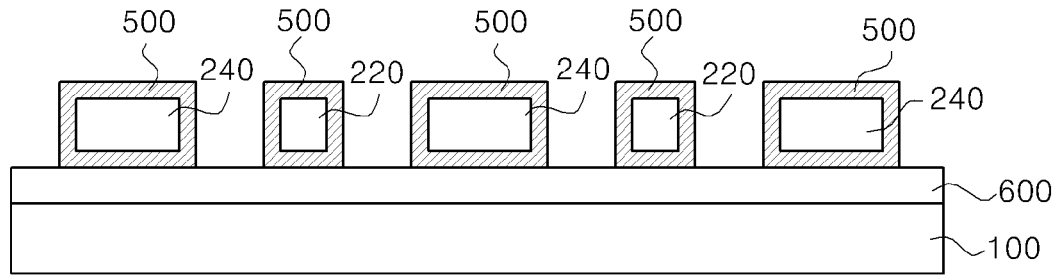
[Fig. 14]
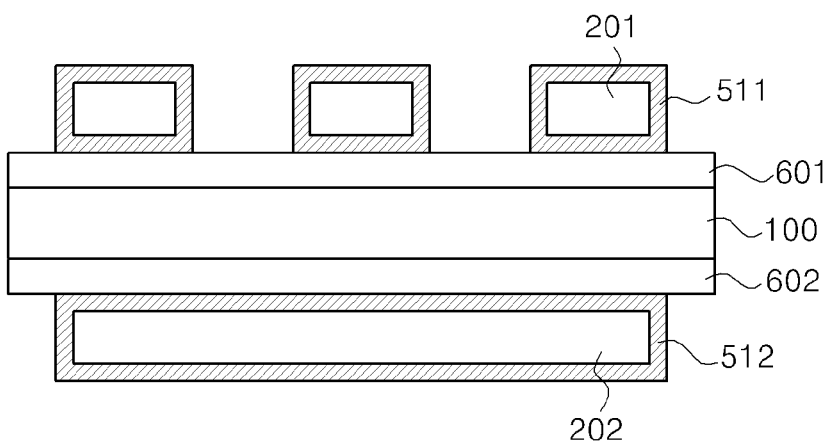
[Fig. 15]
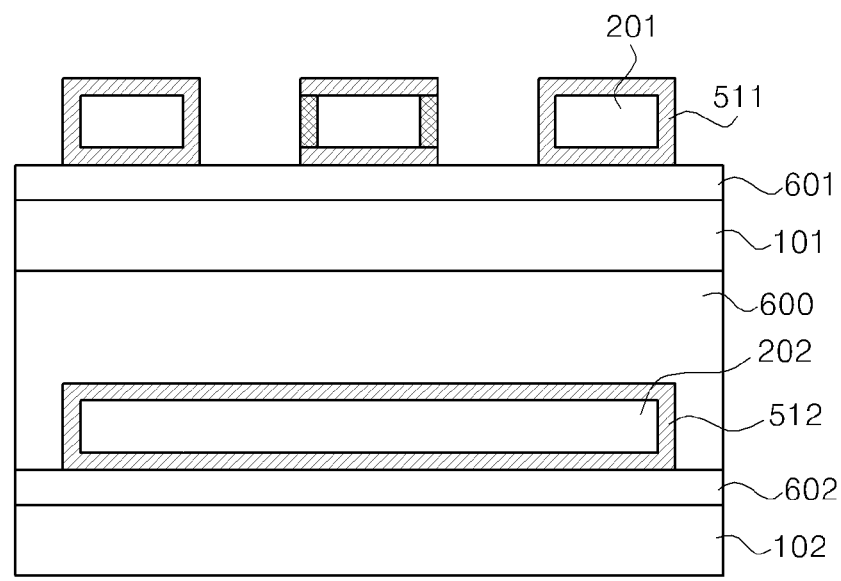

[Fig. 16]
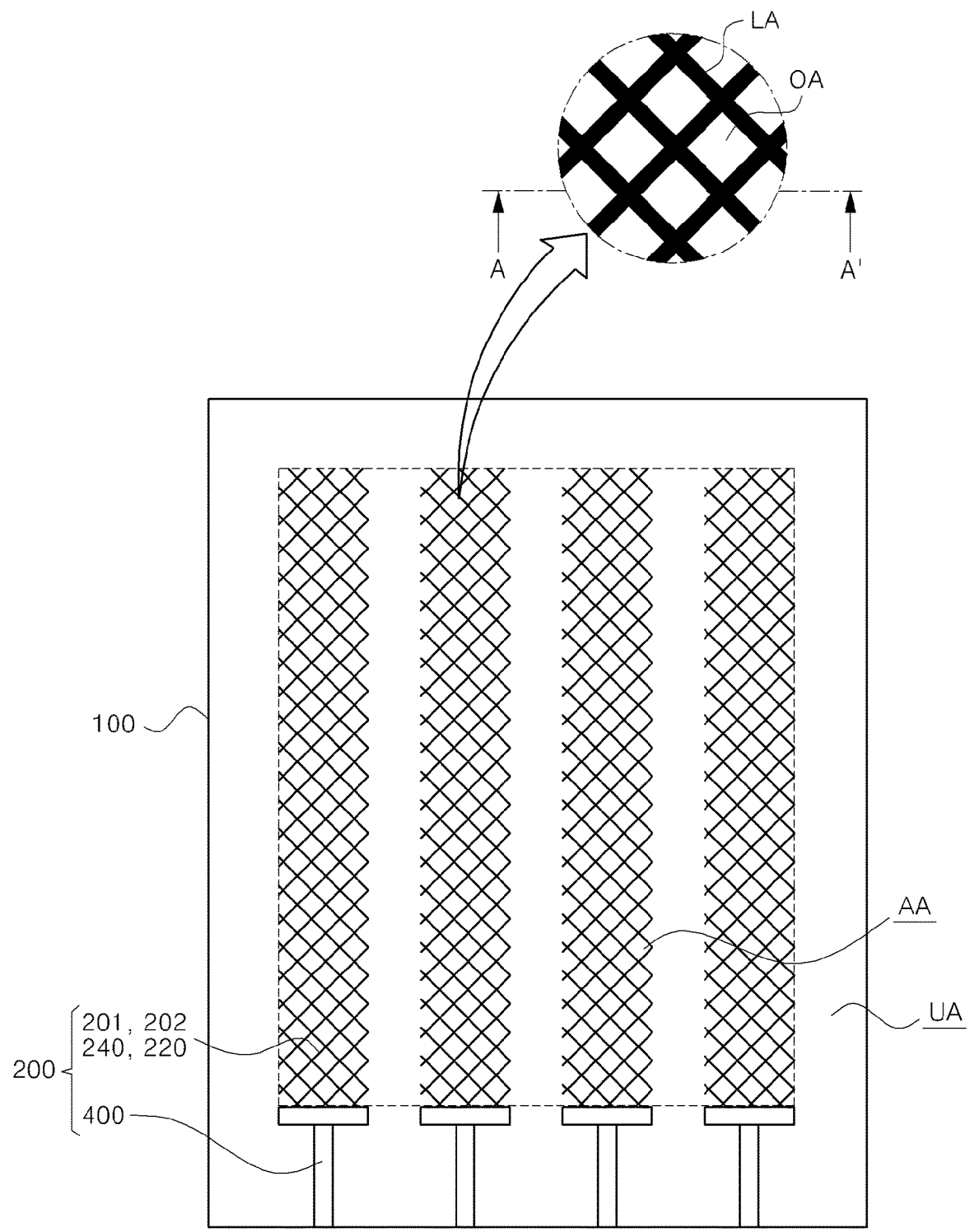

[Fig. 17]
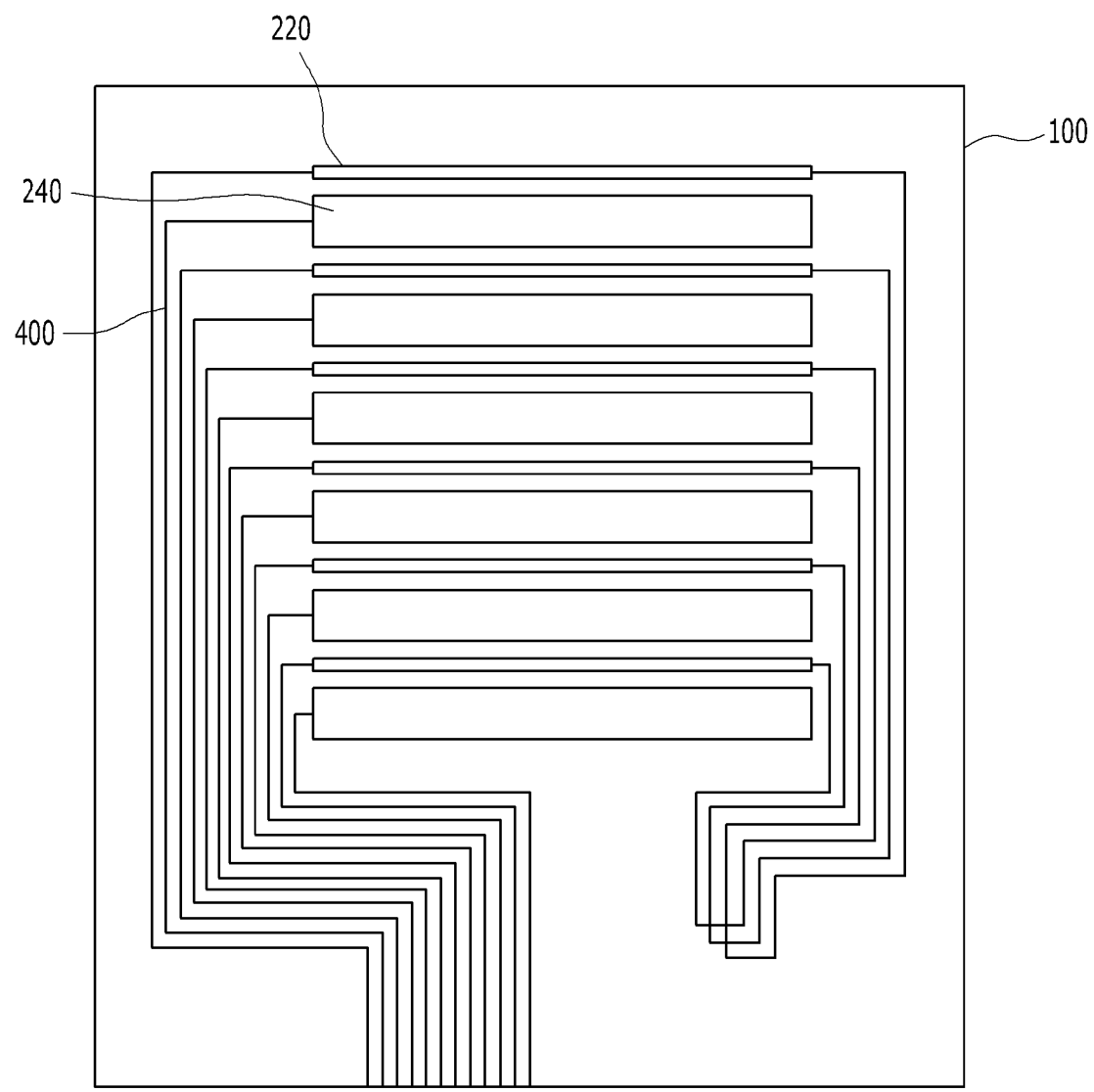
[Fig. 18]
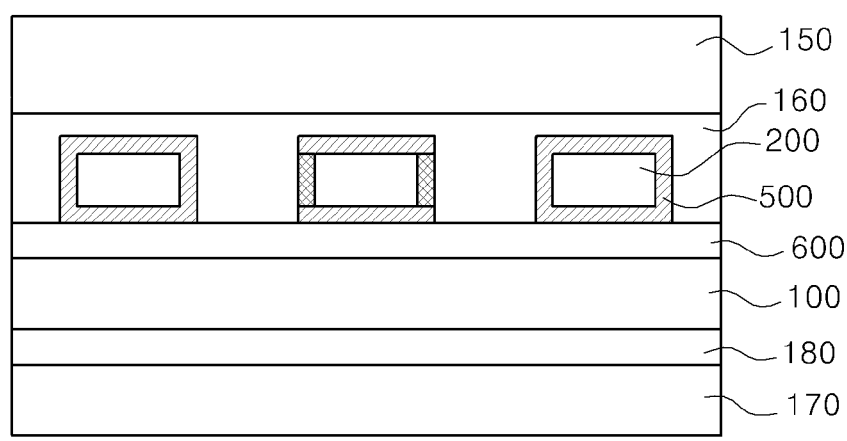

[Fig. 19]
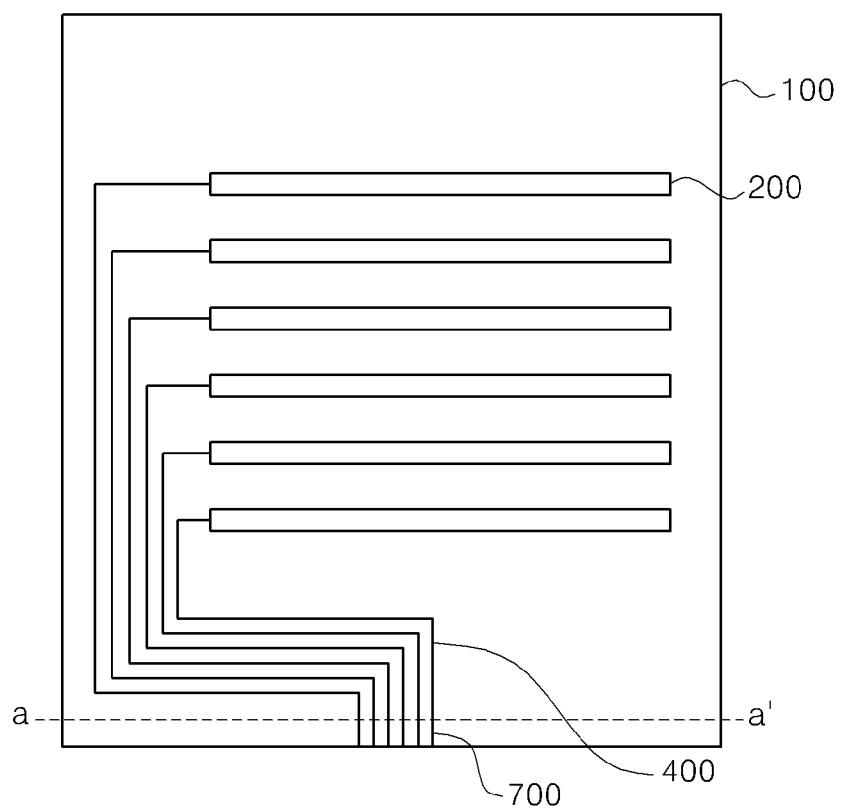
[Fig. 20]
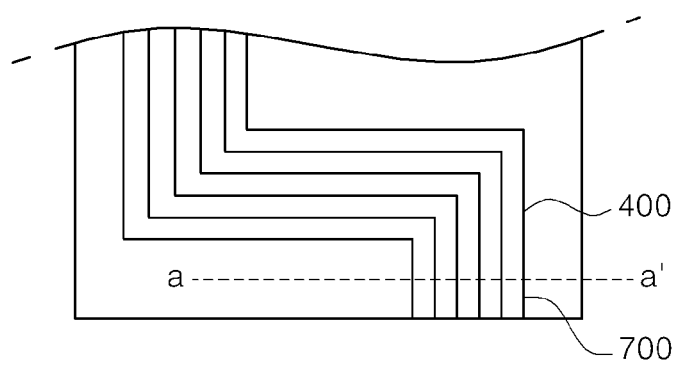

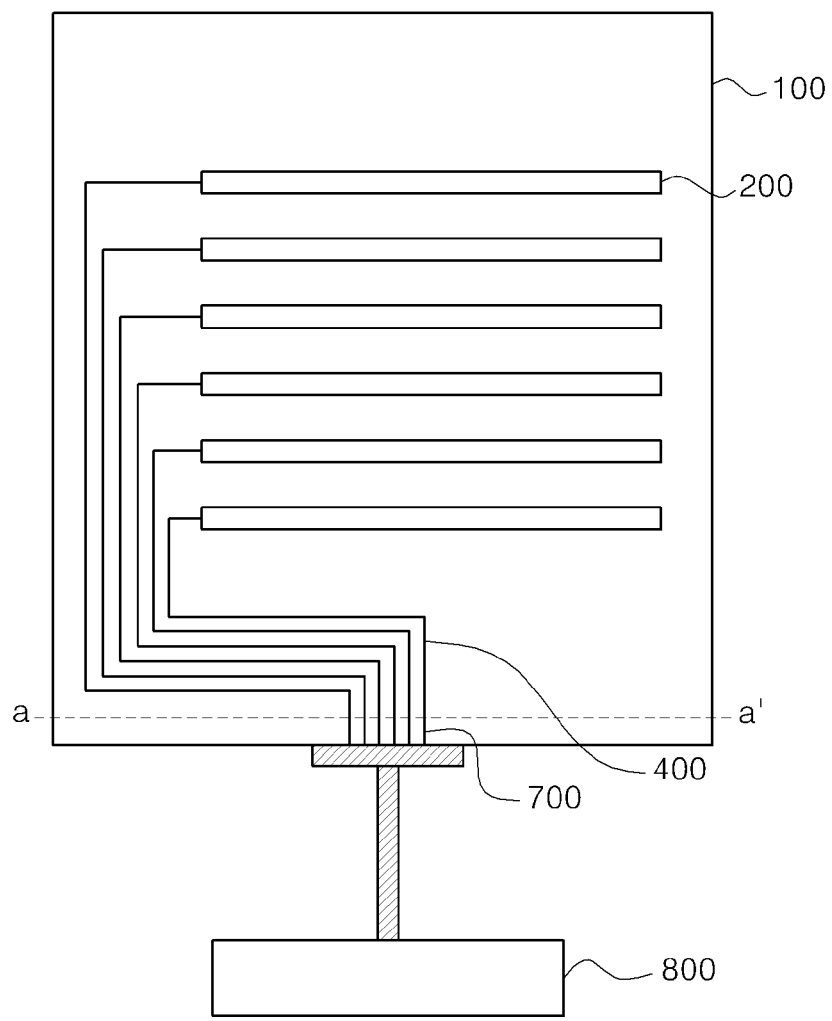
[Fig. 21]

[Fig. 22]
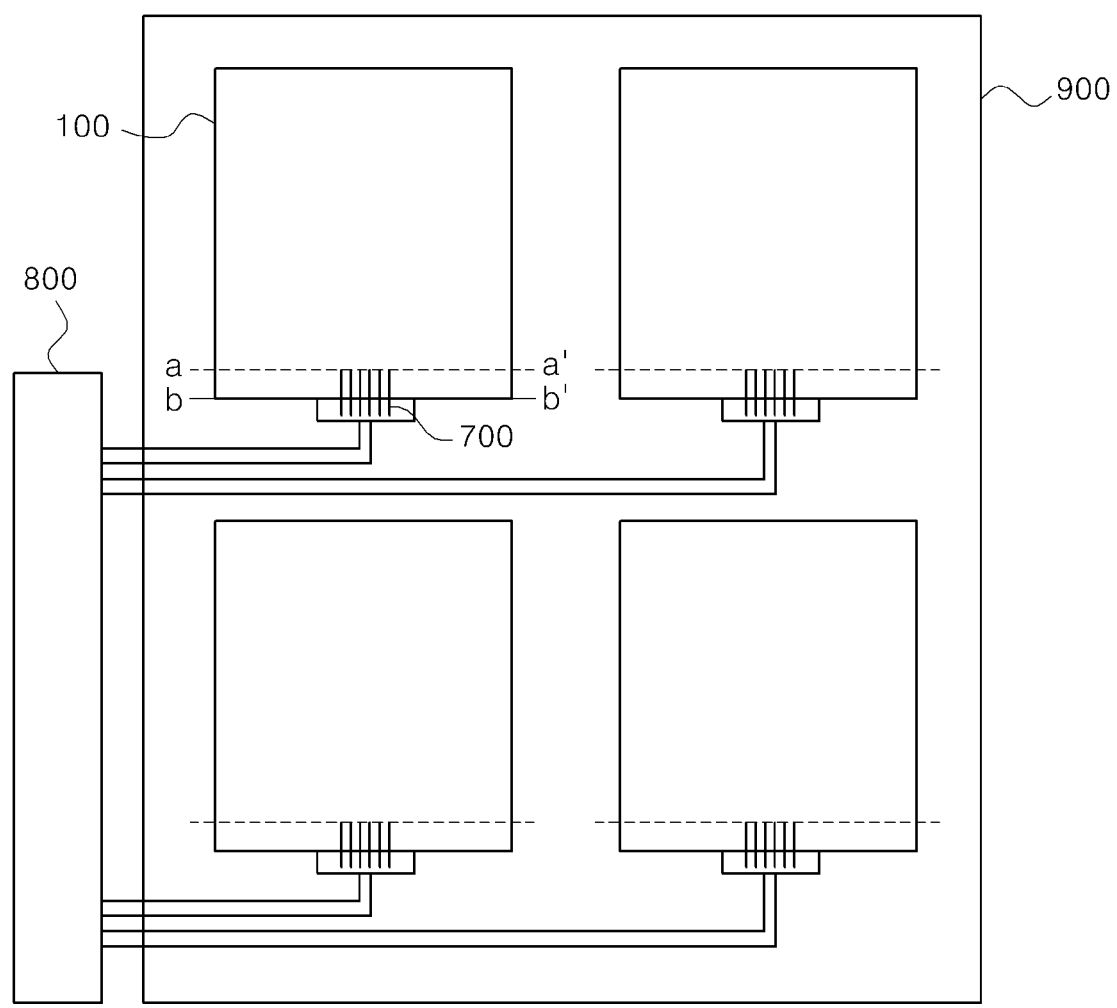
[Fig. 23]
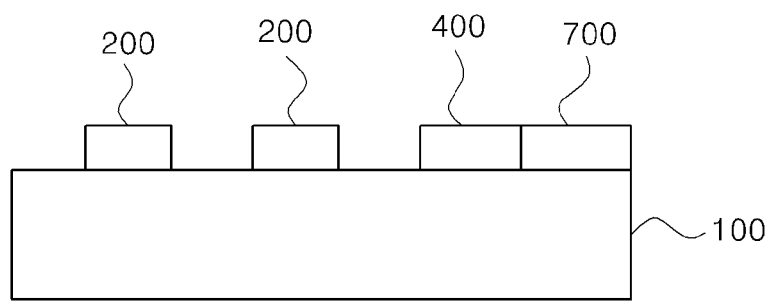

[Fig. 24]
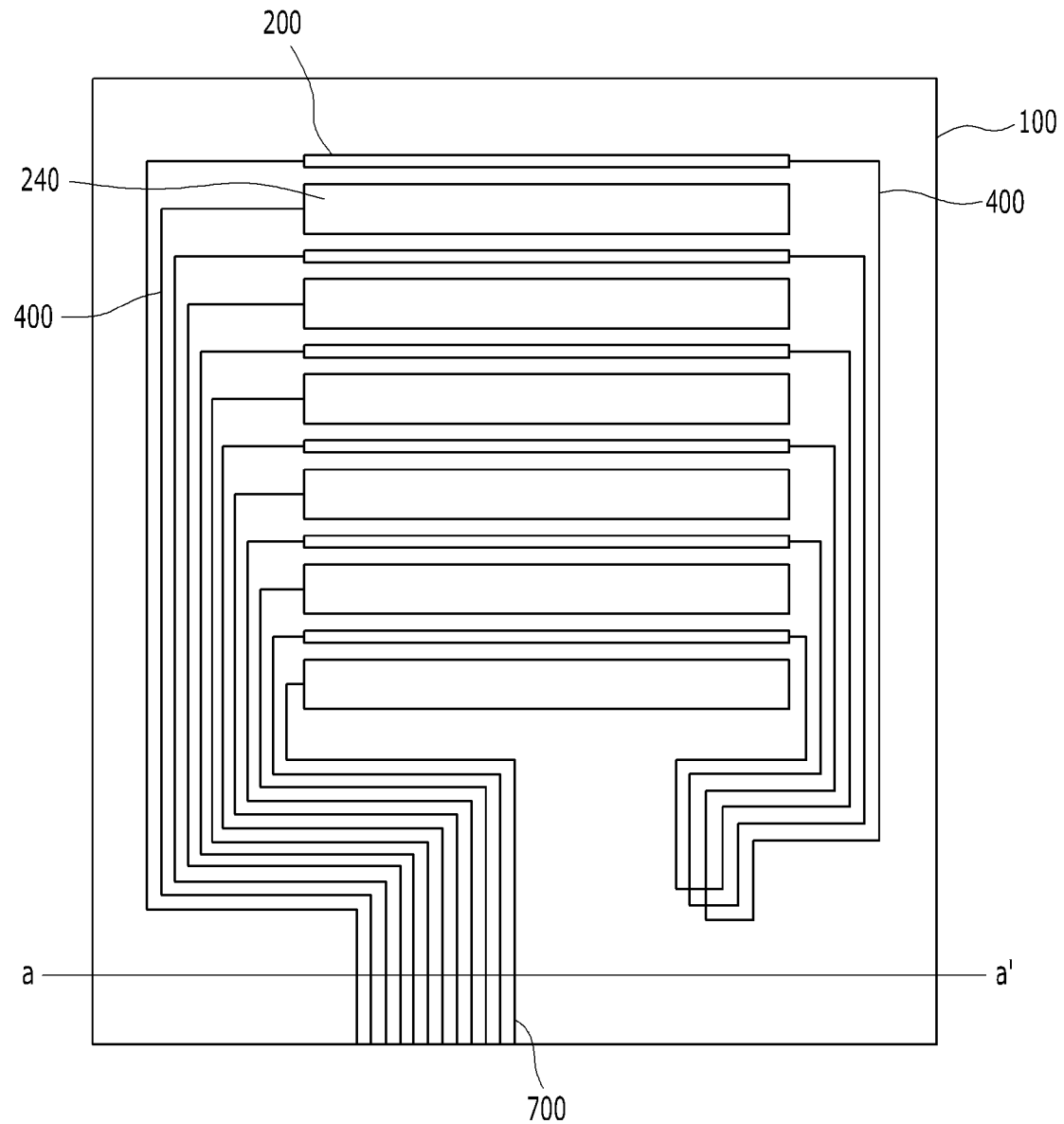
[Fig. 25]
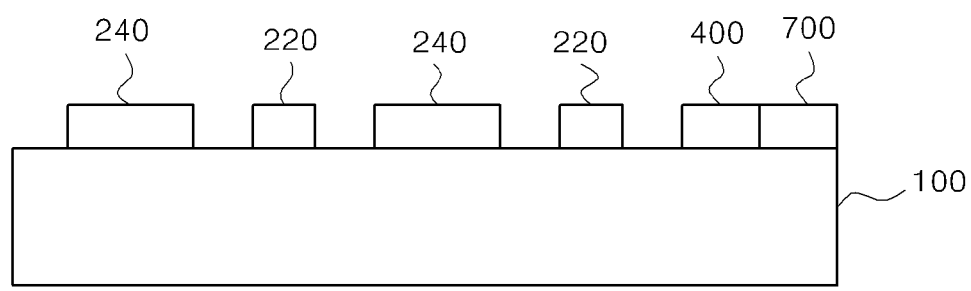

[Fig. 26]
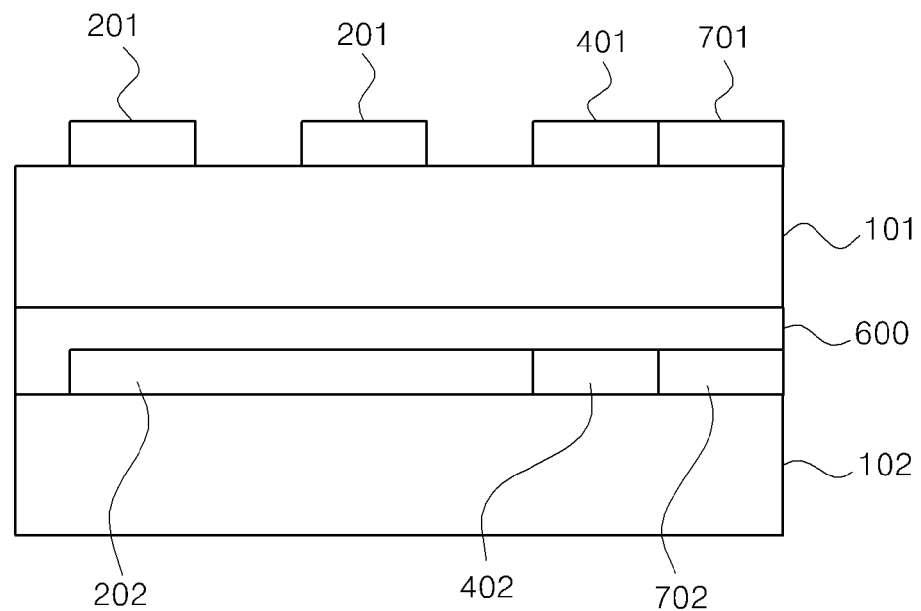
[Fig. 27]
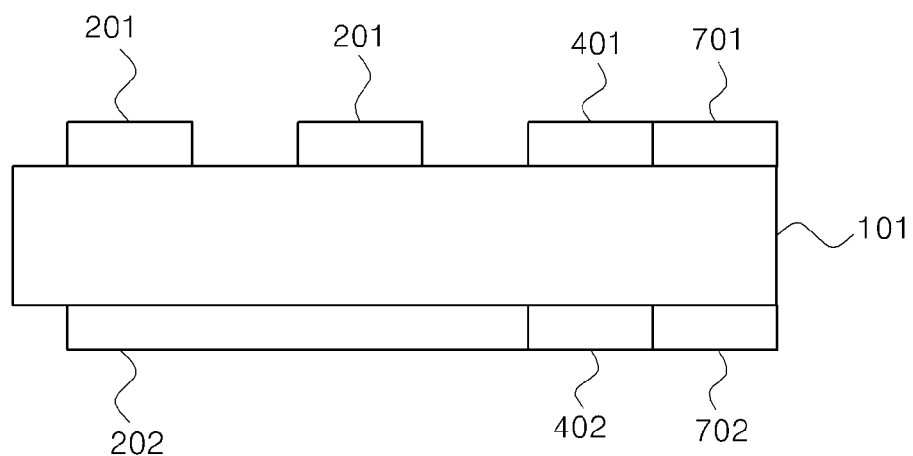

[Fig. 28]
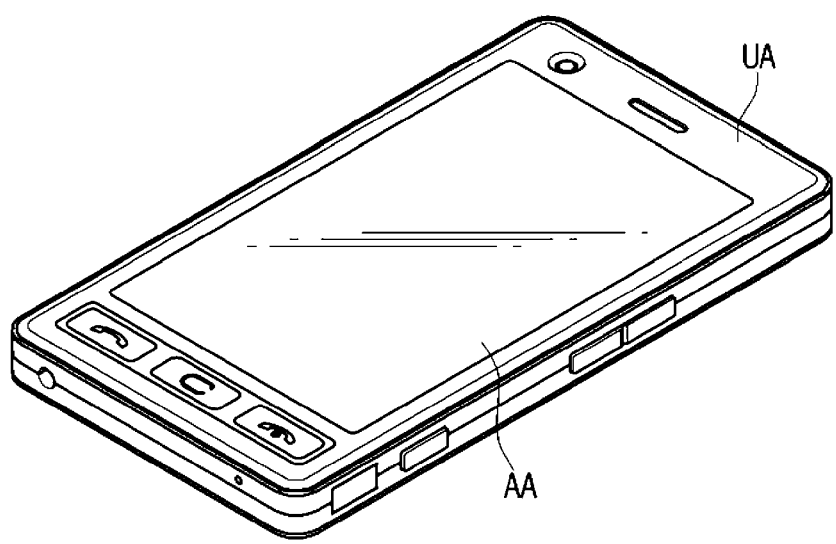

[Fig. 29]
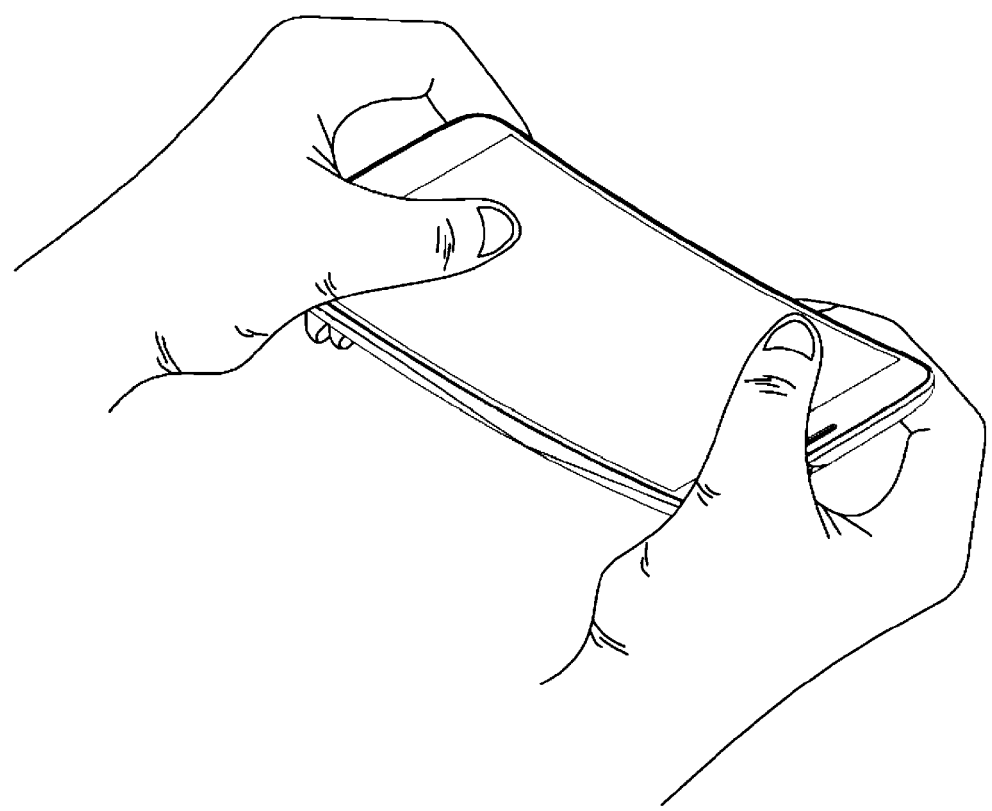

[Fig. 30]
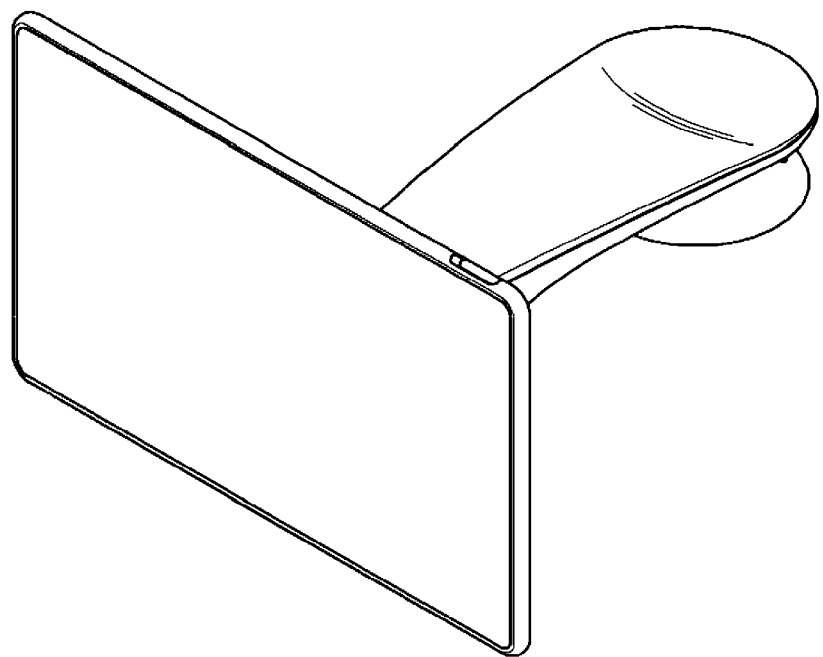

[Fig. 31]

TOUCH PANEL

CROSS-REFERENCE TO RELATED PATENT APPLICATIONS

This application is a U.S. National Stage Application under 35 U.S.C. § 371 of PCT Application No. PCT/KR2016/004584, filed May 2, 2016, which claims priority to Korean Patent Application No. 10-2015-0062561, filed May 4, 2015, Korean Patent Application No. 10-2015-0062562, filed May 4, 2015, Korean Patent Application No. 10-2015-0062563, filed May 4, 2015, and Korean Patent Application No. 10-2015-0063745, filed May 7, 2015, whose entire disclosures are hereby incorporated by reference.

TECHNICAL FIELD

The present invention relates to a touch panel.

BACKGROUND ART

Recently, a touch panel for performing input in such a way to touch an input device, such as a finger or a stylus, with respect to an image displayed on a display device is applied to various electronic products.

The touch panel may be basically divided into a resistive film type touch panel and a capacitive type touch panel. The resistive film type touch panel detects a location by detecting a change in resistance according to a connection between electrodes when pressure is applied to an input device. The capacitive type touch panel detects a location by detecting a change in capacitance between electrodes when a finger touches the location. The capacitive type touch panel has recently been in the spotlight in small models by taking into consideration convenience in a manufacturing method and a sensing force.

Such a touch panel has some problems to be improved.

First, the electrode of the touch panel is electrically connected to a wire, and the wire is connected to an external circuit. In this case, the wire may be cut due to a change in the design between the electrode and the wire or a change in density. Furthermore, there may be a problem in that a conductive characteristic is deteriorated because the wire is not smoothly connected due to a crack within the electrode.

Second, in a recent electronic product, a loop type pen touch electrode for detecting input according to a stylus pen is included in a touch panel in order to use the stylus pen as input means. Since the pen touch electrode for detecting input according to the stylus pen occupies some area of the touch panel, there may be a problem in that the size of the touch panel, in particular, the size of the invalid area of the touch panel is increased.

Third, the electrode formed on the touch panel is made of a metal material. The metal material is not a transparent material, but has a unique glittering characteristic. Accordingly, there is a problem in that the visibility of the touch panel is reduced because the electrode can be externally seen.

Fourth, in general, a failure in the touch panel, such as the conduction and disconnection of the wire formed in the touch panel, is detected using touch panel test equipment. There is a problem in that the touch panel is damaged due to the touch panel test equipment because the touch panel test equipment performs a failure by touching the touch panel. Furthermore, there is a problem in that a failure generated during the fabrication process of the touch panel cannot be detected because such a failure test is performed after the fabrication of the touch panel is completed.

DISCLOSURE OF INVENTION

Technical Problem

Accordingly, the present invention has been made in view of the above problems, and it is an object of the present invention to improve an electrical conduction characteristic of a touch panel, to reduce the size of the touch panel, to improve the visibility of the touch panel, and to minimize damage to a substrate when a failure in the touch panel is tested.

Solution to Problem

In accordance with an aspect, a proposed touch panel comprises a substrate divided into a valid area and an invalid area; an electrode formed in the valid area of the substrate and configured to detect touch input; and a wire formed in the invalid area of the substrate and electrically connected to the electrode, wherein the electrode is formed in a mesh form, and the touch panel further comprises a dummy electrode formed in an area in which the electrode and the wire are connected.

Furthermore, the dummy electrode can be formed in a mesh form and the mesh form can comprise mesh lines, and an opening portion between the mesh lines.

Furthermore, the opening portion of the mesh form of the electrode and the opening portion of the mesh form of the dummy electrode may have different sizes.

Furthermore, in the touch panel, the electrode comprises a pen touch electrode for detecting a touch signal by a stylus pen.

Furthermore, the electrode can further comprise a detection electrode for detecting an electrostatic input signal.

Furthermore, the detection electrode and the pen touch electrode can be alternately disposed over the substrate.

Furthermore, in the touch panel, the dummy electrode is formed in the invalid area of the substrate.

A touch panel according to another embodiment of the present invention comprises a substrate; and a plurality of pen touch electrode loops formed in the substrate, wherein a width of a pen touch electrode loop which belongs to the plurality of pen touch electrode loops and which is formed in on an outermost side of the substrate is smaller than a width of other pen touch electrode loops disposed in the substrate.

Furthermore, each of the pen touch electrode loops can comprise a plurality of pen touch electrodes formed over the substrate; and a wire connecting one ends of a plurality of the pen touch electrodes.

Furthermore, the wire can connect any two of the plurality of pen touch electrodes or can connect at least three of the plurality of pen touch electrodes.

Furthermore, in the touch panel, the substrate can be divided into a valid area and an invalid area, and part of the pen touch electrode loop formed on the outermost side can be formed in the invalid area.

Furthermore, an area which comprises the pen touch electrode loop formed on the outermost side and which is formed in the valid area can be wider than an area formed in the invalid area.

Furthermore, the substrate can be divided into a valid area and an invalid area, and the plurality of pen touch electrode loops can be disposed to overlap in the valid area.

Advantageous Effects of Invention

In accordance with an embodiment of the present invention, there are advantages in that electrical conductivity between the electrode and wire of the touch panel can be improved and visibility can be maintained.

Furthermore, in accordance with an embodiment of the present invention, there are advantages in that the width of the bezel area of the touch panel can be reduced and the plurality of pen touch electrode loops can be arranged on the touch panel even without a complicated jumping structure.

Furthermore, in accordance with an embodiment of the present invention, there are advantages in that the visibility of the touch panel can be improved and the oxidation and change of the electrode can be minimized.

Furthermore, in accordance with an embodiment of the present invention, there are advantages in that damage to the substrate can be prevented when a failure in the touch panel is tested, accuracy in detecting a failure can be increased, and a failure can be detected during the fabrication process of the touch panel.

BRIEF DESCRIPTION OF DRAWINGS

FIG. 1 is a plan view of a touch panel according to a first embodiment of the present invention.

FIG. 2 is a plan view of the touch panel related to another form of the first embodiment of the present invention.

FIG. 3 is a plan view of the touch panel related to yet another form of the first embodiment of the present invention.

FIG. 4 is a plan view of a touch panel according to a second embodiment of the present invention.

FIG. 5 is a plan view of a touch panel before the second embodiment of the present invention is applied.

FIG. 6 is a plan view of the touch panel related to another form of the second embodiment of the present invention.

FIG. 7 is a plan view of the touch panel related to yet another form of the second embodiment of the present invention.

FIG. 8 is a plan view of the touch panel related to further yet another form of the second embodiment of the present invention.

FIG. 9 is a plan view of the touch panel related to still yet another form of the second embodiment of the present invention.

FIG. 10 shows the outermost loop of an asymmetrical shape.

FIG. 11 is a plan view of the touch panel related to further yet another form of the second embodiment of the present invention.

FIG. 12 is a cross-sectional view of a touch panel according to a third embodiment of the present invention.

FIG. 13 is a cross-sectional view of the touch panel related to another form of the third embodiment of the present invention.

FIG. 14 is a cross-sectional view of the touch panel related to yet another form of the third embodiment of the present invention.

FIG. 15 is a cross-sectional view of the touch panel related to further yet another form of the third embodiment of the present invention.

FIG. 16 is a plan view of a touch panel of a mesh form.

FIG. 17 is a plan view of a touch panel in which detection electrodes and pen touch electrodes have been formed according to an embodiment of the present invention.

FIG. 18 is a cross-sectional view of the touch panel according to the third embodiment of the present invention.

FIG. 19 is a plan view of a touch panel according to a fourth embodiment of the present invention.

FIG. 20 is an exemplary diagram showing test pattern units according to the fourth embodiment of the present invention.

FIG. 21 is a cross-sectional view of the touch panel according to the fourth embodiment of the present invention.

FIG. 22 shows a test apparatus connected to the touch panel according to the fourth embodiment of the present invention.

FIG. 23 is a plan view schematically showing the touch panel related to the fourth embodiment of the present invention.

FIG. 24 is a plan view schematically showing the touch panel related to another form of the fourth embodiment of the present invention.

FIG. 25 is a cross-sectional view schematically showing the touch panel related to yet another form of the fourth embodiment of the present invention.

FIG. 26 is a cross-sectional view schematically showing the touch panel related to the fourth embodiment of further yet another form of the present invention.

FIG. 27 is a cross-sectional view schematically showing the touch panel related to still yet another form of the fourth embodiment of the present invention.

FIGS. 28 to 31 show examples in which the touch panels according to various embodiments of the present invention have been applied.

MODE FOR THE INVENTION

The details of the objects and technical configurations of the present invention and acting effects thereof will be more clearly understood from the following detailed description based on the accompanying drawings. Hereinafter, embodiments of the present invention are described in detail with reference to the accompanying drawings.

The embodiments disclosed in this specification should not be construed or used as limiting the scope of the present invention. It is evident to those skilled in the art that a description including the embodiments of this specification may have various applications. Accordingly, some embodiments described in the detailed description of the present invention are illustrative for better understanding, and the scope of the present invention is not intended to be restricted by the embodiments.

Functional blocks illustrated in the drawings and described hereunder are only examples of possible implementations. In other implementations, other functional blocks may be used without departing from the spirit and scope of the detailed description.

Furthermore, it should be understood that an expression that some elements are "included" is an expression of an "open type" and the expression simply denotes that the corresponding elements are present, but does not exclude additional elements.

Furthermore, the meaning that each layer (or film), an area, patterns, or structures are formed "over/on" or "under/beneath" a substrate, each layer (or film), an area, a pad, or patterns includes that they are directly formed on or beneath the substrate, layer (or film), area, pad, or patterns and that they are formed over or under the substrate, layer (or film), area, pad, or patterns with a third layer interposed therebetween.

Furthermore, when one element is described as being "connected" or "coupled" to the other element, it should be understood that one element may be directly connected or coupled to the other element, but a third element may be interposed between the two elements.

Furthermore, terms, such as the first and the second, may be used to describe various elements, but the elements are not restricted by the terms. The terms are used to only distinguish one element from the other element.

Hereinafter, touch panels according to the first embodiment to fourth embodiment of the present invention are described below with reference to the accompanying drawings.

First Embodiment

First, a touch panel according to a first embodiment is described with reference to FIGS. 1 to 3.

FIG. 1 is a plan view of the touch panel according to the first embodiment of the present invention.

In the present embodiment, the touch panel includes a substrate 100 divided into a valid area AA and an invalid area UA, electrodes 200 formed in the valid area of the substrate 100 and configured to detect touch input, and wires 400 formed in the invalid area of the substrate 100 and electrically connected to the electrodes 200.

The substrate 100 is means for supporting the electrodes 200, the wires 400, etc. The substrate 100 may be rigid or flexible. For example, the substrate 100 may include glass or plastic. More specifically, the substrate 100 may include chemically reinforced/semi-reinforced glass, such as soda lime glass or alumino silicate glass, may include reinforced or flexible plastic, such as polyimide (PI), polyethylene terephthalate (PET), propylene glycol (PPG), and polycarbonate (PC), or may include sapphire. Furthermore, the substrate 100 may include an optically isotropic film. For example, the substrate 100 may include a cyclic olefin copolymer (COC), a cyclic olefin polymer (COP), optically isotropic polycarbonate (PC), or optically isotropic polymethylmetacrylate (PMMA). Sapphire can significantly increase touch response speed because it has an excellent characteristic, such as a dielectric constant, can easily implement a space touch, such as hovering, and may be used as a cover substrate because it has high surface strength. Hovering means a technology in which coordinates are recognized even at a location slight distant from a display.

Furthermore, the substrate 100 may be bent with a partially curved surface. That is, the substrate 100 may have a partially plane and may be bent with a partially curved surface. More specifically, the end of the substrate 100 may be bent with a curved surface or may be bent or curved with a surface including random curvature.

Furthermore, the substrate 100 may be a curved or bent substrate. That is, the touch panel including the substrate 100 may be formed to have a flexible, curved, or bent characteristic. Accordingly, the touch panel according to an embodiment can be easily carried and changed in various designs.

The substrate 100 may include a cover substrate. That is, the electrodes 200, the wires 400, etc. may be supported by the cover substrate. Alternatively, a separate cover substrate may be further disposed on the substrate 100. That is, the electrodes 200, the wires 400, etc. may be supported by the substrate 100. The substrate 100 and the cover substrate may coalease together (or may be adhered together) through an adhesive layer.

The valid area AA and the invalid area UA may be defined in the substrate 100. An image may be displayed on the valid area AA, and an image may not be displayed on the invalid area UA disposed around the valid area AA. Furthermore, the location of an input device (e.g., a finger) may be detected in at least one of the valid area AA and the invalid area UA. When an input device, such as a finger, touches such a touch panel, a difference in capacitance is generated in the portion touched by the input device. The portion having such a difference may be detected as a contact location.

The electrode 200 may include a transparent conductive material that allows electricity to flow therethrough while not hindering the transmission of light. For example, the electrode 200 may include metal oxide, such as indium tin oxide, indium zinc oxide, copper oxide, tin oxide, zinc oxide, and titanium oxide. Furthermore, the electrode 200 may include a nanowire, a photoresist nanowire film, a carbon nanotube (CNT), graphene, conductivity polymer, or various types of metal. For example, the electrode 200 may be made of chrome (Cr), nickel (Ni), copper (Cu), aluminum (Al), silver (Ag), molybdenum (Mo) or an alloy of them.

Furthermore, the electrodes 200 formed in a view area or an active area may be made of a transparent conductive material, such as a Cu mesh or an Ag mesh, in addition to ITO. That is, patterns made of the aforementioned material may be implemented in a mesh form and thus may be effectively used to improve the visibility of an image. Furthermore, the wires 400 extended from the electrodes 200 may be made of various materials including a stack type material, such as ITO, a Cu mesh, an Ag mesh, Cu, Ag, or metal nitride oxide.

The electrodes 200 according to another embodiment of the present invention may be formed in a mesh form having mesh lines and opening portions.

The mesh line may be made of a conductive material, such as metal paste including at least one of Cr, Ni, Cu, Al, Ag, Mo and an alloy of them.

The electrodes 200 may include a plurality of sub-electrodes. The sub-electrodes may be intersected and disposed in a mesh form. More specifically, the plurality of sub-electrodes intersected in a mesh form may include mesh lines LA and opening portions OA between the mesh lines LA. The line width of the mesh line LA may be about 0.1 μm to about 10 μm. If the line width of the mesh line LA is less than about 0.1 μm, a fabrication process is impossible or a disconnection may be generated in the mesh line. If the line width of the mesh line LA exceeds about 10 μm, visibility may be reduced because the mesh lines are seen on the outside. The line width of the mesh line LA may be about 0.5 μm to about 7 μm. More specifically, the line width of the mesh line may be about 1 μm to about 3.5 μm.

Furthermore, the opening portion may have various shapes. For example, the opening portion OA may have various shapes, such as a polygon, for example, a quadrangle, a diamond shape, a pentagon, or a hexagon, or a circle. Furthermore, the opening portion may have a regular shape or a random shape.

The sub-electrodes may be formed in a mesh form, so the electrodes 200 are not seen to a user on the display area. That is, although the electrode 200 is made of metal, it may not be visually recognized by a user. Furthermore, although the electrode 200 is applied to a large-sized touch panel, resistance of a touch panel can be reduced.

In addition to the electrodes 200, the wire 400 may have a mesh structure.

The touch panel according to the first embodiment includes a dummy electrode 300 in the area in which the electrode 200 and the wire 400 are connected.

The dummy electrode 300 comes in contact with the electrode 200 and the wire 400, thus electrically connecting the electrode 200 and the wire 400. In relation to the disposition of the dummy electrode 300 on the substrate, the dummy electrode 300 may be formed to be present in the invalid area or valid area of the substrate or in the invalid area and valid area of the substrate.

Furthermore, the dummy electrode 300 may include the same or similar material to the electrode 200. Furthermore, the dummy electrodes 300 may be formed in a mesh form.

The dummy electrode 300 is an element for improving the electrical characteristics of the touch panel by preventing the cutting of the wire 400 between the electrode 200 and the wire 400. If the electrodes 200 are formed in a mesh form, the electrode 200 and the wire 400 may be electrically disconnected because the number of contacts at which the electrode 200 and the wire 400 are electrically connected is not secured in terms of the structural characteristic of the mesh.

In the touch panel according to the first embodiment, the dummy electrode 300 is formed in the area in which the electrode 200 and the wire 400 are connected. The electrode 200 and the wire 400 can be connected more densely through the dummy electrode 300. As a result, electrical conductivity between the electrode 200 and the wire 400 can be prevented, and the cutting of a wire is prevented. Furthermore, although a crack is generated in the electrode 200, reliability of the touch panel can be improved because the electrode 200 and the wire 400 are electrically connected through the dummy electrode 300.

In relation to the touch panel according to the first embodiment, the mesh structure of the electrodes 200 or the dummy electrodes 300 may be formed by disposing a metal layer on the entire surface of the substrate 100 and etching the metal layer in a mesh form in order to form patterns of a mesh form. For example, metal, such as copper (Cu), may be deposited on the entire surface of the substrate 100, such as polyethyleneterephthalate, and copper metal mesh electrodes 200 having an embossing mesh form may be formed by etching the copper layer.

In another implementation example of the first embodiment, after a resin layer (or a middle layer) including photocuring resin (UV resin) or thermosetting resin is formed on the substrate 100, engraving patterns of a mesh form may be formed on the resin layer, and the engraving pattern may be filled with a conductive material. In this case, the engraving pattern of the resin layer may be formed by imprinting a mold having an embossing pattern. The conductive material may be metal paste including at least one of Cr, Ni, Cu, Al, Ag, Mo and an alloy of them. Accordingly, the engraving patterns of a mesh form may be filled with metal paste or then cured, or the engraving patterns of a mesh form may be formed by plating the engraving patterns.

In yet another implementation example of the first embodiment, a resin layer (or a middle layer) including photocuring resin (UV resin) or thermosetting resin may be formed on the substrate 100. Embossing or engraving nanopatterns and micropatterns of a mesh form may be formed on the resin layer. A metal layer made of at least one of Cr, Ni, Cu, Al, Ag, Mo and an alloy of them may be deposited on the resin layer using a sputtering process. The embossing pattern of the nanopattern and micropattern may be formed by imprinting a mold having an engraving pattern. The engraving pattern may be formed by imprinting a mold having an embossing pattern. Next, the metal layer formed on the nanopattern and the micropattern may be etched so that only the metal layer formed on the nanopattern is removed, but the metal layer remains on the micropattern, thereby being capable of forming patterns of a mesh form. When the metal layer is etched, there may be a difference in the etch rate depending on a difference in the junction area of the metal layer and the nanopattern and the junction area of the metal layer and the micropattern. That is, since the junction area of the micropattern and the metal layer is greater than that of the nanopattern and the metal layer, the metal layer formed on the micropattern remains intact because the material of the electrode formed on the micropattern is less generated and the metal layer formed on the nanopattern is etched and removed with respect to the same etching rate. Accordingly, the embossing or engraving patterns of a mesh form of the micropatterns may be formed on the substrate 100.

In the touch panel according to the first embodiment, the mesh form of the electrodes 200 and the mesh form of the dummy electrodes 300 may be different in the size of the opening portion. In particular, the mesh of the dummy electrode 300 may have a smaller opening portion than that of the electrode 200. The dummy electrode 300 formed in the area in which the wire 400 and the electrode 200 are connected has a denser mesh than the electrode 200. As a result, in an embodiment of the present invention, the number of contacts of the wire 400 and the dummy electrode 300 is much greater than the number of contacts when the wire 400 and the electrode 200 are directly connected. As described above, as the number of contacts of the wire 400 and the dummy electrode 300 increases, electrical conductivity between the wire 400 and the electrode 200 can be improved and a failure rate according to the generation of an open portion in a circuit can be reduced.

More specifically, the diameter of the opening portion of the dummy electrode 300 may be 10% to 50% of the diameter of the opening portion of the electrode 200. If the diameter of the opening portion of the dummy electrode 300 is less than 10% of the diameter of the opening portion of the electrode 200, there may be a difficulty in the process because the size of the mesh form of the dummy electrodes 300 is too dense. If the diameter of the opening portion of the dummy electrode 300 exceeds 50% of the diameter of the opening portion of the electrode 200, the degree that electrical conductivity is improved is reduced because an increase in the number of contacts of the wire 400 and the electrode 200 is small.

In yet another implementation example of the first embodiment, the mesh form of the electrodes 200 and the mesh form of the dummy electrodes 300 may be different in the width of a mesh line, that is, a line width. In particular, if the line width of the mesh of the dummy electrode 300 is thicker than that of the mesh of the electrode 200, the area in which the wire 400 comes in contact with the dummy electrode 300 can be further increased compared to a related art. As described above, as the contact area between the wire 400 and the dummy electrode 300 increases, conductivity between the wire 400 and the electrode 200 can be improved and a failure rate according to the generation of an open portion in a circuit can be reduced.

A contact point and contact surface between the wire 400 and the dummy electrode 300 can be maximized by a combination of the aforementioned implementation examples, that is, by forming the diameter of the opening portion of the dummy electrode 300 smaller than the diameter of the opening portion of the electrode 200 and also forming the dummy electrode 300 to have a thick line width.

FIG. 2 is a plan view of the touch panel related to another form of the first embodiment of the present invention.

Referring to FIG. 2, the electrode 200 may include a pen touch electrode 220 for detecting a touch signal by a stylus pen.

The pen touch electrode 220 is an element for detecting an input location by detecting electromagnetic induction or a change in the electric field generated when a stylus pen, etc, approaches the touch panel. The pen touch electrode 220 may be formed based on the aforementioned material, shape, etc. of the electrode 200. A plurality of the pen touch electrodes 220 forms a loop, and may detect whether electromagnetic induction is generated in the loop or an electric field is changed.

The electrode 200 may further include a detection electrode 240 for detecting an electrostatic input signal.

The detection electrode 240 is an element for identifying an input location by detecting a change in capacitance according to input. The detection electrode 240 may be implemented based on the material, shape, etc. described above in connection with the electrode 200.

In this case, at least one of the pen touch electrodes 220 and the detection electrodes 240 may be formed in a mesh form. The dummy electrodes 300 of a mesh form may be formed in the area in which at least one of the pen touch electrode 220 and the detection electrode 240 and the wire 400 are connected. This has been described in detail above, and a detailed description thereof is omitted.

In an embodiment of the present invention, the detection electrode 240 and the pen touch electrode 220 may be alternately disposed on the substrate 100.

In the state in which the detection electrode 240 and the pen touch electrode 220 have been disposed in the entire valid area of the substrate 100 so that they do not overlap, the detection electrode 240 and the pen touch electrode 220 may be alternately disposed on the substrate 100 in order to detect input according to a capacitance method and input according to an electromagnetic induction or electric field change detection method with respect to the touch panel.

In another implementation example of the first embodiment, a plurality of the pen touch electrodes 220 may be disposed between adjacent detection electrodes 240. This may be seen from FIG. 3. FIG. 3 is a plan view of the touch panel according to another implementation example. From FIG. 3, it may be seen that two pen touch electrodes 220 are formed between adjacent detection electrodes 240. The plurality of pen touch electrodes 220 may be connected to form a loop structure, and input may be detected based on such a structure. In order to effectively form the loop structure, a plurality of the pen touch electrodes 220 may be disposed between adjacent detection electrodes 240.

In an embodiment of the present invention, the dummy electrode 300 may be formed in the invalid area of the substrate 100. Accordingly, the dummy electrode 300 having mesh lines formed relatively denser than those of the electrode 200 may not affect the visibility of the touch panel. Furthermore, electrical conductivity between the wire 400 and the electrode 200 can be improved.

Second Embodiment

Various methods for implementing a touch panel according to a second embodiment of the present invention are described below with reference to FIGS. 4 to 11.

FIG. 4 is a plan view of the touch panel according to the second embodiment of the present invention.

In the second embodiment, the touch panel includes a substrate 100 and a plurality of pen touch electrode loops 225 formed in the substrate 100. The width of a pen touch electrode loop 225 that belongs to the plurality of pen touch electrode loops 225 that is formed on the outermost side of the substrate 100 may be smaller than the width of each of the remaining pen touch electrode loops 225 disposed in the substrate 100. Although the pen touch electrode loop 225 has been illustrated as being a single solid line in FIG. 4, a pen touch electrode 220 and a wire 400 may be extended to form a single loop.

Each of the elements is described below. First, the substrate 100 is the same as the substrate 100 described in connection of the first embodiment, and a redundant description thereof is omitted.

The pen touch electrode loop 225 is means for detecting input by a stylus pen. The pen touch electrode loop 225 is formed in a loop form on the substrate 100. A closed loop may be formed based on means for determining a location by processing a change in the electric field or an induced current which is detected or generated in the pen touch electrode loop 225, for example, a control unit. In other words, one end of the pen touch electrode loop 225 itself is open, but the open portion may be connected to the control unit, thereby being capable of completing the closed loop.

FIG. 4 shows a plurality of the pen touch electrode loops 225. In FIG. 4, the loop having a rectangle has been illustrated as being formed on the substrate 100, but is not limited to such a shape. The loops may be disposed as in FIG. 4 by taking into consideration dispositions with other elements included in the touch panel, the visibility of the touch panel, and the location detection performance of the pen touch electrode loop 225.

When the control unit driven by the pen touch electrode 220, for example, sequentially supplies an electric current to the pen touch electrode loops 225, electromagnetism is sequentially induced into the pen touch electrode loops 225. The location of a stylus pen may be determined by detecting a change of the electromagnetism induced as described above when the electromagnetism reacts with the stylus pen. Alternatively, the stylus pen may detect its location by inducing power into the pen touch electrode loop 225.

In this case, in an embodiment of the present invention, the width of the pen touch electrode loop 225 formed on the outermost side of the substrate 100 is smaller than the width of each of the remaining pen touch electrode loops 225. From FIG. 4, it may be seen that the width w1 of the pen touch electrode loop 225 formed on the outermost side of the substrate 100 is smaller than the width w2 of each of the remaining pen touch electrode loops 225. A comparison with a related art is described.

FIG. 5 is a plan view of a touch panel before the technical spirit of the second embodiment is applied. In the example shown in FIG. 5, the plurality of pen touch electrode loops 225 has the same shape and also has the same size and width.

If the plurality of pen touch electrode loops 225 has the same shape, size, and width as described above, an electrical characteristic change generated depending on the locations of a stylus pen and a pen touch electrode loop 225 may be identically applied in the electrode loops. Accordingly, there are advantages in that the control unit can easily determine a location and a process is facilitated because the sizes and shapes of the pen touch electrode loops 225 do not need to be diversified when the touch panel is fabricated.

In the structure of FIG. 5, however, the size of the invalid area of the touch panel relatively increases because the pen touch electrode loop formed on the outermost side occupies a specific space in the invalid area. This leads to a problem in that the bezel of a touch device to which such a touch panel has been applied increases. If the bezel is increased, several problems are caused by taking into consideration the application of various technologies for reducing the bezel in terms of a sense of beauty and performance improvement of a touch device to which a touch panel is applied.

However, if width of the pen touch electrode loop 225 formed on the outermost side is formed to be smaller than the width of each of the remaining pen touch electrode loops 225 as in the touch panel of the second embodiment, the bezel of a touch device can be reduced because the space of the invalid area occupied by the pen touch electrode loop 225 formed on the outermost side can be reduced.

A change in the detection of a location attributable to a change in the shape and width of the pen touch electrode loop 225 may be solved if the control unit differently applies processing and operation on a signal detected in the pen touch electrode loop 225 formed on the outermost side.

Another implementation example of the second embodiment is described below.

FIG. 6 is a plan view of the touch panel related to another form of the second embodiment of the present invention. In the present implementation example, a pen touch electrode loop 225 includes a plurality of pen touch electrodes 220 formed on a substrate 100 and a plurality of connection wires 400 connected to one ends of the plurality of pen touch electrodes 220. A plurality of the pen touch electrode loops 225 formed on the substrate 100 forms a loop including the pen touch electrodes 220. The pen touch electrode 220 may include a transparent conductive material so that electricity can flow therethrough while not hindering the transmission of light. The pen touch electrode 220 is the same as the electrode 200 described in connection with the first embodiment, and a redundant description thereof is omitted.

The pen touch electrodes 220 and the connection wires 400 may be connected to form the pen touch electrode loop 225. The pen touch electrodes 220 may be formed in the valid area of the substrate 100 other than the pen touch electrode loop 225 formed on the outermost side. All the connection wires 400 may be formed in the valid area or invalid area of the substrate 100, but visibility can be further improved if all the connections wires 400 are formed in the invalid area.

In an implementation example of the second embodiment, a connection wire 400 may be formed to connect two of the plurality of pen touch electrodes 200. That is, the connection wire 400 is included in each of the pen touch electrode loops 225. In accordance with the present embodiment, an input location according to the driving of the pen touch electrode 220 can be easily detected because each pen touch electrode loop 225 is independently driven by the control unit.

In another implementation example of the second embodiment, a connection wire 400 may connect three or more of the plurality of pen touch electrodes 220. In the present embodiment, a plurality of the pen touch electrode loops 225 shares a connection wire 400. Such an embodiment is shown in FIG. 7. From FIG. 7, it may be seen that one ends (e.g., the side not connected to the control unit) of a plurality of the pen touch electrodes 220 are connected by a single connection wire 400. In the structure of the aforementioned embodiment, a jumping structure needs to be included in the portion in which the pen touch electrode loops 225 overlap so that the pen touch electrode loops 225 are not electrically conductive. For example, an additional structure needs to be further included in the portion in which the pen touch electrode loops 225 overlap by inserting an insulating layer between the overlap portions. If a plurality of the pen touch electrodes 220 shares a single connection wire 400 as in the present embodiment, such a separate element may not be included. In this case, the control unit selectively detects power in the pen touch electrodes 220. That is, if two of a plurality of the pen touch electrodes 220 connected to a single connection wire 400 are used as the input/output path of power provided by the control unit, a single pen touch electrode loop 225 is formed by the selected two pen touch electrodes 220 and the connection wire 400 sharing the selected two pen touch electrodes 220. The control unit may determine an input location by sequentially supplying power to two of the plurality of pen touch electrodes 220 connected to the single connection wire 400 and detecting input.

FIG. 8 is a plan view of a touch panel according to another implementation example of the second embodiment. In the present implementation example, the substrate 100 may be divided into a valid area VA and an invalid area UA. The pen touch electrode loop 225 formed on the outermost side may be formed in the invalid area or valid area of the substrate 100 or in the invalid area and valid area of the substrate 100. As shown in FIG. 8, some of pen touch electrodes 220 formed on the outermost side (i.e., the top end portion of a pen touch electrode on the outermost side or the bottom end portion of a pen touch electrode on the outermost side) may be formed in the invalid area UA, and the remaining pen touch electrodes 220 may be formed in the valid area VA. Accordingly, the pen touch electrode loop 225 on the outermost side may be formed in the valid area and the invalid area both.

More specifically, an area of a pen touch electrode loop 225 on the outermost side of the substrate 100, which is formed in the valid area VA, may be wider than an area of a pen touch electrode loop 225, which is formed in the invalid area UA. This is shown in FIG. 9. There is an advantage in that the size of the bezel of a touch device can be reduced if the area of the pen touch electrode loop 225 formed in the invalid area UA is smaller than the area of the pen touch electrode loop 225 on the outermost side formed in the valid area VA.

In another implementation example, the width of a pen touch electrode loop 225 formed on the outermost side of the substrate 100 may be 10% to 95% of the width of each of other pen touch electrode loops 225 formed in the substrate 100. In this case, the width of the pen touch electrode loop 225 formed on the outermost side may be 30% to 90% of the width of each of other pen touch electrode loops 225 disposed in the substrate 100. More specifically, the width of the pen touch electrode loop 225 on the outermost side may be 50% to 80% of the width of each of other pen touch electrode loops 225 disposed in the substrate 100. In an embodiment of the present invention, in order to reduce the width of a bezel, an area of the pen touch electrode loop 225 on the outermost side, which is occupied in the invalid area, is reduced. In this case, the width of a pen touch electrode loop 225 formed on the outermost side may be 10% to 95%, 30% to 90%, or more specifically, 50% to 80% of the width of each of other pen touch electrode loops 225 disposed in the substrate 100. If the width of the pen touch electrode loop 225 formed on the outermost side is less than 10% of the width of each of other pen touch electrode loops 225 disposed in the substrate 100, there is a problem in that the pen touch electrode loop 225 on the outermost side is included in a pen touch electrode loop 225 next to the pen touch electrode loop 225 on the outermost side. If the width of the pen touch electrode loop 225 formed on the outermost side exceeds 95% of the width of each of other pen touch electrode loops 225 disposed in the substrate 100, the degree that the bezel is reduced is very small. Accordingly, if the width of the pen touch electrode loop 225 formed on the outermost side is included in the aforementioned numeral values, an object proposed by the present invention can be solved.

In another embodiment, the pen touch electrode loop 225 formed on the outermost side of the substrate 100 may be formed to have an asymmetrical shape. From FIG. 10, it may be seen that the pen touch electrode loop 225 formed on the outermost side of the substrate 100 is formed to have an asymmetrical shape unlike other pen touch electrode loops 225. If the pen touch electrode loop 225 formed on the outermost side of the substrate 100 is formed to have an asymmetrical shape as described above, there are advantages in that a connection with a connection wire becomes facilitated and loops can be easily dispose don the substrate.

The pen touch electrode loops 225 of the second embodiment may be disposed to overlap the valid area of the substrate 100. Pen touch input can be detected in the entire valid area of the substrate 100 because the pen touch electrode loops 225 of the second embodiment may be disposed to overlap the valid area of the substrate 100.

In particular, if the pen touch electrode loops 225 are formed on the same substrate 100 as detection electrodes (check a location by detecting a change in capacitance), the pen touch electrodes 220 and the detection electrode may be alternately formed. In this case, a plurality of the pen touch electrodes 220 may be included between adjacent detection electrodes.

More specifically, two or more pen touch electrodes 220 may be present between the detection electrodes. Furthermore, Tx and Rx detection electrodes or pen touch electrodes 220 may be disposed on both surfaces of a single substrate 100.

In particular, if both the detection electrode and the pen touch electrode 220 are formed on the same substrate 100, there are advantages in that a cost in process can be reduced and efficiency can be improved. Furthermore, there is an advantage in that the thickness of a device can be reduced.

FIG. 11 is a plan view of a touch panel according to another implementation example of the second embodiment. At least one of the pen touch electrode loops 225 may be formed in a mesh form. More specifically, pen touch electrodes 220 included in the pen touch electrode loop 225 may be formed in a mesh form. The mesh form may have mesh lines and opening portions.

A method for forming the pen touch electrodes 220 in the mesh form is the same as that for forming the electrodes in the mesh form, which has been described in connection with the first embodiment, and a description thereof is omitted.

Third Embodiment

A touch panel according to a third embodiment is described below with reference to FIGS. 12 to 18.

FIG. 12 is a cross-sectional view of the touch panel according to the third embodiment of the present invention. Referring to FIG. 12, a touch panel according to an implementation example of the third embodiment includes a substrate 100, electrodes 200 disposed over the substrate 100, an anti-reflection layer 500 formed on at least one surface of the electrode 200, and an adhesive layer 600 formed over the substrate 100 and configured to be bonded to the anti-reflection layers 500.

The anti-reflection layer 500 functions to prevent the oxidation of the electrode 200 and to prevent reflection attributable to the total reflection characteristic of the electrode 200. The anti-reflection layer 500 may be formed on at least one surface of the electrode 200. The anti-reflection layer 500 may be formed on the top or bottom of the electrode 200. The anti-reflection layer 500 may include an upper anti-reflection layer 511 formed on the top of the electrode 200 and a lower anti-reflection layer 514 formed on the bottom of the electrode 200.

The anti-reflection layer 500 may be formed on the slanting surface of the electrode 200. The anti-reflection layer 500 may further include side anti-reflection layers 512 and 513 formed on the sides of the electrode 200, in addition to the upper anti-reflection layer 511 formed on the top of the electrode 200 and the lower anti-reflection layer 514 formed on the bottom of the electrode 200.

One side of the anti-reflection layer 500 may be coupled to the substrate 100 through the medium of the adhesive layer 600. The lower anti-reflection layer 514 may be formed on the bottom of the electrode 200 and may be formed on the top of the adhesive layer 600.

After the lower anti-reflection layer 514 is formed on the bottom of the electrode 200, it may be coupled to the top of the adhesive layer 600. If the lower anti-reflection layer 514 is coupled to the adhesive layer 600 using such a method, a low resistance implementation is made possible without a limit to a thickness compared to other methods. If the lower anti-reflection layer 514 and the electrode 200 are formed over the adhesive layer 600, the lower anti-reflection layer 514 and the electrode 200 may form a pattern through an etching process. The upper anti-reflection layer 511 and the side anti-reflection layers 512 and 513 may be formed at the same time using an electroplating method after the lower anti-reflection layer 514 and the electrode 200 are disposed over the adhesive layer 600.

The thickness of the adhesive layer 600 is not limited, but may be 5 µm~15 µm. For example, the thickness of the adhesive layer 600 may be 7 µm~13 µm. More specifically, the thickness of the adhesive layer 600 may be 8 µm~11 µm. The lower anti-reflection layer 514 is formed on the top of the adhesive layer 600. In order to bond the adhesive layer 600 and the lower anti-reflection layer 514 together, the thickness of the adhesive layer 600 may be 5 µm. In contrast, there may be a problem in that a surface of the adhesive layer 600 becomes irregular as the thickness of the adhesive layer 600 increases. If the final surface of the adhesive layer 600 is irregular, there is a problem in implementing a pattern, such as the electrode 200. Furthermore, if the surface of the adhesive layer 600 is not regular, an illuminance step may be generated. In order to prevent such problems, the thickness of the adhesive layer 600 may be 15 µm or less.

The thickness of the anti-reflection layer 500 may be 10 nm~500 nm. For example, the thickness of the anti-reflection layer 500 may be 50 nm~300 nm. More specifically, the thickness of the anti-reflection layer 500 may be 60 nm~150 nm. The thickness of the anti-reflection layer 500 may be 10 nm or more in order to protect the electrode 200 and to have visibility. The thickness of the anti-reflection layer 500 may be 500 nm or less. A processing time increases as the thickness of the anti-reflection layer 500 increases. If the processing time increases, the anti-reflection layer 500 may be thermally deformed. In order to prevent the anti-reflection layer 500 from being thermally deformed, the thickness of the anti-reflection layer 500 may be 500 nm or less.

Furthermore, the anti-reflection layer 500 may be black metal oxide. The anti-reflection layer 500 may be any one of copper oxide, chrome oxide, iron oxide, and nickel oxide, and may be a black-series material capable of suppressing reflexibility. The anti-reflection layer 500 may have an opaque and black-series color. The anti-reflection layer 500 may include at least any one of black, gray and a mixed color of time.

The anti-reflection layer 500 may be oxide having the same materials as the electrode 200. The electrode 200 may include any one of chrome (Cr), nickel (Ni), copper (Cu), aluminum (Al), silver (Ag), molybdenum (Mo) and an alloy of them. The anti-reflection layer 500 may be oxide of a material included in the electrode 200.

The anti-reflection layer 500 may be coupled to the substrate 100 through the medium of the adhesive layer 600. In this case, the adhesive layer 600 may be made of any one of resin, optical clear resin (OCR), and optical clear adhesives (OCA).

Furthermore, the thickness of the electrode 200 may be 1 μm~10 μm. For example, the thickness of the electrode 200 may be 0.5 μm~15 μm. More specifically, the thickness of the electrode 200 may be 0.1 μm~20 μm.

FIG. 13 is a cross-sectional view of a touch panel according to another implementation example of the third embodiment. Referring to FIG. 13, the electrode 200 may be a detection electrode 240 or a pen touch electrode 220. The pen touch electrode 220 is an electrode for detecting input by a pen using an electromagnetic induction method. Furthermore, the electrode 200 may be the detection electrode 240 for detecting input according to an electrostatic method, and may be an electrode in which both the pen touch electrode 220 and the detection electrode 240 are disposed on the substrate 100. In the electrode 200 having both the detection electrode 240 and the pen touch electrode 220 disposed on the substrate 100, a single pen touch electrode 220 may be disposed in an adjacent detection electrode 240, and a plurality of the pen touch electrodes 220 may be disposed in an adjacent detection electrode 240.

FIG. 14 is a cross-sectional view of a touch panel according to yet another implementation example of the third embodiment. Referring to FIG. 14, the electrode 200 in which the anti-reflection layer 500 has been formed may be disposed on both sides of the substrate 100. A first electrode 201 in which a first anti-reflection layer 511 has been formed may be disposed on one side of the substrate 100. The first electrode 201 is coupled to the substrate 100 through the medium of a first adhesive layer 601. A second electrode 202 in which a second anti-reflection layer 512 has been formed may be disposed on the other side of the substrate 100. The second electrode 202 is coupled to the substrate 100 through the medium of the second adhesive layer 602.

FIG. 15 is a cross-sectional view of a touch panel according to still yet another implementation example of the third embodiment. Referring to FIG. 15, the electrode 200 in which the anti-reflection layer 500 has been formed may be disposed in one or more substrates. The first electrode 201 in which the first anti-reflection layer 511 has been formed may be disposed in a first substrate 101. The first electrode 201 is coupled to the first substrate 101 through the medium of the first adhesive layer 601. The second electrode 202 in which the second anti-reflection layer 512 has been formed may be disposed in a second substrate 102. The second electrode 202 is coupled to the second substrate 102 through the medium of the second adhesive layer 602. The first substrate 101 having the first electrode 201 formed therein and the second substrate 102 having the second electrode 202 formed therein may be coupled together through the medium of the adhesive layer 600.

FIG. 16 is a plan view of a touch panel in which another implementation example of the third embodiment, that is, a mesh electrode, has been disposed. FIG. 17 is a plan view of the touch panel in which the detection electrode and the pen touch electrode according to another implementation example of the third embodiment have been formed. Referring to FIGS. 16 and 17, one or more of the detection electrodes 240 and the pen touch electrodes 220 may be formed in a mesh form. More specifically, the electrode 200 includes a plurality of sub-electrodes, and the sub-electrodes may be disposed to cross each other in a mesh form. In this case, the line width of a mesh line may be about 0.1 μm to about 10 μm. If the line width of the mesh line is less than about 0.1 μm, a fabrication process may be impossible or a disconnection may be generated in the mesh line. If the line width of the mesh line exceeds about 10 μm, visibility may be reduced because an electrode pattern is externally viewed. For a method of implementing the electrodes in a mesh form, reference may be made to the first embodiment and the second embodiment.

FIG. 18 shows a cross section in which the touch panel of the third embodiment has been combined with other elements. Referring to FIG. 18, the touch panel may include a cover substrate 150 and the substrate 100. The cover substrate 150 may be disposed over the substrate 100. Furthermore, the cover substrate 150 may include the same or similar material to the substrate 100. The cover substrate 150 may coalease with the substrate 100. The cover substrate 150 and the substrate 100 coalease together through the medium of a cover substrate adhesive layer 160 made of optical transparent adhesives OCA between the cover substrate 150 and the substrate 100.

The touch panel according to the third embodiment may be disposed on a display panel 170. The touch panel may be combined with the display panel 170 through an adhesive layer. The adhesive layer may include the optical transparent adhesives OCA. The display panel 170 may be a liquid crystal display (LCD) or an organic light-emitting diode (OLED).

The electrodes 200 and the anti-reflection layer 500 may be disposed in the display panel 170. The display panel may be implemented as follows.

The display panel 170 may include a first substrate and a second substrate. If the display panel 170 is a liquid crystal display panel, the display panel 170 may have a structure in which the first substrate including a thin film transistor (TFT) and a pixel electrode and the second substrate including color filters have bonded together with a liquid crystal layer interposed therebetween.

Furthermore, the display panel 170 may be an LCD panel having a color filter on transistor (COT) structure in which a thin film transistor, color filters, and a black matrix are formed in the first substrate and the second substrate is bonded to the first substrate with a liquid crystal layer interposed therebetween. That is, the TFT may be formed on the first substrate, a passivation film may be formed on the TFT, and the color filters may be formed on the passivation film. Furthermore, a pixel electrode coming in contact with the TFT is formed in the first substrate. In this case, in order to improve an open ratio and simplify a mask process, the black matrix may be omitted and a common electrode may be formed to also function as the black matrix.

Furthermore, if the display panel 170 is an LCD panel, it may further include a backlight unit for providing light at the back of the display panel 170. If the display panel 170 is an organic electroluminescent display panel, the display panel 170 includes a self-emissive device that does not require a separate light source. The display panel 170 includes the TFD formed on the first substrate and an organic light-emitting element configured to come in contact with the TFT. The organic light-emitting element may include a positive electrode, a negative electrode, and an organic light-emitting layer formed between the positive electrode and the negative electrode. Furthermore, the display panel 170 may further include the second substrate functioning as a sealing substrate for encapsulation on the organic light-emitting element.

The display panel 170 and the touch panel may be integrated. The electrodes 200 formed in at least one of the first substrate and second substrate of the touch panel may be formed in at least one of the first substrate and second substrate of the display panel 170. In this case, at least any one of the first and the second substrates formed in the touch panel may be omitted.

The electrodes 200 may be disposed on one surface of the display panel 170. That is, the electrodes 200 may be formed in the first substrate or second substrate of the display panel 170. In this case, at least one electrode 200 may be formed on the top surface of a substrate disposed on the upper side. That is, the electrodes 200 may be formed on a surface of the display panel 170. For example, first electrodes may be formed on the first substrate of the display panel 170, and second electrodes may be formed in the cover substrate 150 of the touch panel or a substrate included in the touch panel.

A polarization plate may be further included under the touch panel. The polarization plate may be a line polarization plate or an external light anti-reflection polarization plate. If the display panel 170 is an LCD panel, the polarization plate may be a line polarization plate. Furthermore, if the display panel 170 is an organic electroluminescent display device, the polarization plate may be an external light anti-reflection polarization plate. The touch device according to the present embodiment may not include at least one substrate for supporting the electrodes 200 in the touch panel. Accordingly, a thin and light-weight touch device can be formed.

Fourth Embodiment

A touch panel according to a fourth embodiment is described below with reference to FIGS. 19 to 27.

FIG. 19 is a plan view schematically showing a touch panel according to an implementation example of the fourth embodiment. FIG. 20 is an exemplary diagram schematically showing test pattern units. Referring to FIGS. 19 and 20, the touch panel according to an implementation example of the fourth embodiment includes the substrate 100 and the electrodes 200 disposed over the substrate 100. Furthermore, the touch panel includes the wires 400 connected to the electrodes 200 and extended to the outside of the substrate 100 and test pattern units 700 connected to the wires 400.

The substrate 100 is divided into a valid area and an invalid area configured to surround the outside of the valid area. The test pattern units 700 are disposed in the invalid area. The test pattern units 700 are disposed for the open/short (O/S) and electrostatic discharge (ESD) tests of the touch panel. The test pattern units 700 are the extension lines of the wires 400 disposed in the substrate 100 and are disposed on one side of the substrate 100. The wires 400 are disposed in an area connected to the electrodes 200 on the basis of line a-a'. An area disposed on one side of the substrate 100 on the basis of line a-a', that is, the extension lines of the wires 400, is the test pattern units 700.

The test pattern units 700 may be disposed in a process for disposing the wires 400 in the substrate 100. The test pattern unit 700 may be made of any material if it is disposed on one side of the substrate 100 and capable of performing the open/short (O/S) and electrostatic discharge (ESD) tests of the touch panel. The test pattern units 700 may be made of the same material as the wire 400s. If the test pattern units 700 are made of the same material as the wires 400 in the process for disposing the wires 400, the test pattern units 700 can be disposed without damage to the touch panel and a cost for fabricating the touch panel can be reduced because process steps are not increased.

The wire 400 may include metal oxide, such as indium tin oxide, indium zinc oxide, copper (Cu) oxide, tin oxide, zinc oxide, and titanium oxide, a nanowire, a photoresist nanowire film, a carbon nanotube (CNT), graphene, a conductivity polymer, chrome (Cr), nickel (Ni), copper (Cu), aluminum (Al), silver (Ag), molybdenum (Mo) or an alloy of them. The test pattern units 700 may be made of the same or similar material to the wires 400.

The width of the test pattern unit 700 is not limited if the test pattern unit 700 is disposed on one side of the substrate 100 and capable of the open/short (O/S) and electrostatic discharge (ESD) tests of the touch window 100. For example, the test pattern unit 700 may have the same width as the wire 400. If the test pattern units 700 are disposed to have the same widths as the wires 400 in a process for disposing the wires 400, the test pattern units 700 can be disposed without damage to the touch panel and a cost for fabricating the touch panel can be reduced because process steps are not increased.

Furthermore, the thickness of the test pattern unit 700 is not limited if the test pattern unit 700 is disposed on one side of the substrate 100 and capable of the open/short (O/S) and electrostatic discharge (ESD) tests of the touch window 100. For example, the test pattern unit 700 may have the same thickness as the wire 400. If the test pattern units 700 are disposed to have the same thickness as the wires 400 in a process for disposing the wires 400, the test pattern units 700 can be disposed without damage to the touch panel and a cost for fabricating the touch panel can be reduced because process steps are not increased.

FIG. 21 is a cross-sectional view schematically showing a touch panel according to an implementation example of the fourth embodiment. Referring to FIG. 21, the electrodes 200, the wires 400, and the test pattern units 700 are disposed in the touch panel. In this case, the electrodes 200 may be pen touch electrodes. The electrodes 200 may be formed in a mesh form. More specifically, the electrodes 200 include a plurality of sub-electrode. The sub-electrode may be disposed to cross each other in a mesh form.

FIG. 21 is an exemplary diagram showing a test apparatus 800 connected to the touch panel according to an implementation example of the fourth embodiment. FIG. 22 is a plan view schematically showing a sheet substrate 900 in which the touch panel according to an implementation example of the fourth embodiment has been disposed. Referring to FIG. 21, the test apparatus 800 is connected to the test pattern units 700 of the touch panel, and performs open/short (O/S) and electrostatic discharge (ESD) tests on the touch panel. Referring to FIG. 22, the test apparatus 800 may be connected to one or more touch panels disposed in the sheet substrate 900 and may detect a failure in the touch panels.

The touch panels disposed in the sheet substrate 900 may be tested in the entire process step. When a process for each of the touch panels is completed, the touch panel is cut along line b-b', thereby implementing an individual touch panel. When the test pattern units 700 are disposed, they may be extended further to line b-b', that is, the cutting surface of the touch panel.

When a process for the touch panel is completed, the touch panel is cut along line b-b', and only part of the test pattern units 700 that have been first disposed remains in the touch panel. In this case, the sheet substrate 900 is the same as the substrate 100 of the touch panel. When the electrodes 200, the wires 400, and the test pattern units 700 are disposed in the sheet substrate 900 and cut, the touch panels are completed. After a test on the touch panel in which the test pattern units 700 have been disposed is completed, the touch panel is cut from the sheet substrate 900, thus becoming touch panels. However, the test pattern units 700 remain on each touch panel.

The length of the test pattern units 700 remaining on the touch panel is not limited, but may be 100 μm~1 cm. The test apparatus 800 includes tips and tests the touch panels. The tips come in contact with the test pattern units 700 of the touch panel and perform open/short (O/S) and electrostatic discharge (ESD) tests on the touch panel. The test pattern units 700 may have a length of 100 μm or more so that the tips of the test apparatus 800 can sufficiently come in contact with the test pattern units 700. The touch panel according to an implementation example of the fourth embodiment has an advantage in that the touch panel can be tested at any time during the process. The length of the test pattern units 700 may be 100 μm or more so that the tips of the test apparatus 800 can come in contact with the test pattern units 700 in a next process although the test pattern units 700 are damaged when the tips of the test apparatus 800 come in contact with the test pattern units 700.

The touch panel according to an implementation example of the fourth embodiment may be applied to a navigator for vehicles in addition to a touch device for mobile terminals, and may also be applied to a large-sized touch panel. The test pattern units 700 may be formed to have a minimum length in such a touch device or a touch panel. The length of the test pattern units 700 may be a maximum of 1 cm in order to be used for a test on a large-sized touch panel.

FIG. 24 is a plan view schematically showing a touch panel according to yet another implementation example of the fourth embodiment. FIGS. 25 to 27 are cross-sectional views schematically showing touch panels according to other implementation examples. Referring to FIGS. 24 and 25, the electrodes 200 of the touch panel according to an implementation example of the present invention may include one or more of pen touch electrodes and detection electrodes of a capacitance method. Electrodes on the touch panel in which the test pattern units 700 according to an implementation example of the present invention have been disposed are not limited to electrode units of a specific method, such as the pen touch electrodes or the detection electrodes.

Referring to FIG. 26, the touch panel according to another implementation example may have an electrode unit, wires, and test pattern units disposed in one or more substrates. First electrodes 201, first wires 401, and first test pattern units 701 may be disposed in a first substrate 101. A second electrode 202, a second wire 402, and a second test pattern unit 702 may be disposed in a second substrate 102 combined with the first substrate 101 through the medium of an adhesive layer 600.

Referring to FIG. 27, the touch panel according to another implementation example may have electrodes, wires, and test pattern units disposed on one side and the other side of a single substrate. The first electrodes 201, the first wires 401, and the first test pattern units 701 may be disposed on one side of the substrate 101. The second electrode unit 202, the second wire 402, and the second test pattern unit 702 may be disposed on the other side of the substrate 101.

FIGS. 28 to 31 show examples in which the touch panels according to various embodiments of the present invention have been applied.

FIG. 28 shows an example in which the touch panel according to an embodiment of the present invention has been applied to a mobile device. The aforementioned touch panel may be applied to the display portion of a mobile device.

FIG. 29 shows a mobile device having a curved surface display. In the present embodiment, a touch panel that is bent with a partially curved surface has been applied to a substrate. For example, the substrate may be a touch panel that partially has a plane and a curved surface and that is bent. More specifically, the end of the substrate may be bent with a curved surface or may be bent or curved with a surface having random curvature. In some embodiments, the substrate itself may be a flexible substrate having a flexible characteristic. In addition, the substrate may be a curved or bent substrate. That is, the touch panel including the substrate may also be formed to have a flexible, curved, or bent characteristic. Accordingly, a mobile device to which the touch panel according to an embodiment has been applied can be easily carried and can be changed in various designs.

FIG. 30 shows an example in which the touch panel according to an embodiment of the present invention has been formed in such a way as to be attachable to or detachable from another device by connection means. For example, the touch panel according to an embodiment of the present invention may be applied to a navigator for vehicles, and may be attached to or detached from a vehicle.

FIG. 31 shows an example in which a display for vehicles has been implemented through the touch panel according to an embodiment of the present invention. A dash board and a front manipulation unit for a vehicle may be implemented by the touch panel according to an embodiment of the present invention.

The embodiments of the present invention have been disclosed for illustrative purposes, and portions that may be modified, changed, and added by those skilled in the art to which the present invention pertains within the technical spirit of the present invention should be construed as belonging to the claims.

The invention claimed is:
1. A touch panel, comprising:
a substrate divided into a valid area and an invalid area;
a plurality of pen touch electrodes provided at least in the valid area of the substrate, and configured to detect a touch by a pen, wherein each of the pen touch electrodes is to separately extend in a first direction, and the plurality of pen touch electrodes are arranged in a second direction different than the first direction, wherein at least two of the pen touch electrodes are provided in a loop configuration;
a plurality of detection electrodes provided at least in the valid area of the substrate, and configured to detect an electrostatic input, wherein each of the detection electrodes is to separately extend in the first direction, and the plurality of detection electrodes are arranged in the second direction, wherein a first one of the pen touch electrodes is adjacent, in the second direction, a first side of a first one of the detection electrodes,
a second one of the pen touch electrodes is adjacent, in the second direction, a second side of the first one of the detection electrodes,
a third one of the pen touch electrodes is adjacent, in the second direction, the second one of the pen touch electrodes and is adjacent, in the second direction, a first side of a second one of the detection electrodes, and
a fourth one of the pen touch electrodes is adjacent, in the second direction, a second side of the second one of the detection electrodes,
wherein one end of the first one of the pen touch electrodes is connected by a loop connector with one end of the fourth one of the pen touch electrodes; and
a plurality of wires provided in the invalid area of the substrate,
wherein each of the pen touch electrodes is separately configured as a mesh, wherein each mesh comprises a plurality of mesh lines, and a plurality of opening portions, and
each of the detection electrodes is separately configured as a mesh, wherein each mesh comprises a plurality of mesh lines and a plurality of opening portions, and
a plurality of dummy electrodes provided in the invalid area of the substrate, wherein each of the dummy electrodes to separately connect to a different one of the pen touch electrodes and the detection electrodes, and each of the dummy electrodes is to connect to a separate one of the plurality of wires,
wherein each of the dummy electrodes are separately configured as a mesh, wherein each mesh comprises a plurality of mesh lines, and a plurality of opening portions, wherein one of the opening portions is provided between at least two of the mesh lines,
wherein the opening portion of one of the dummy electrodes has a smaller size than the opening portion of one of the pen touch electrodes, and
the opening portion of another one of the dummy electrodes has a smaller size than the opening portion of one of the detection electrodes.

2. The touch panel of claim 1, wherein a line width of one of the pen touch electrodes is different than a line width of one of the dummy electrodes, and
a line width of one of the detection electrodes is different than the line width of the one of the dummy electrodes.

3. The touch panel of claim 1, wherein each of the plurality of the pen touch electrodes is provided in the loop configuration on the substrate.

4. The touch panel of claim 1, wherein the detection electrode and the pen touch electrode are alternately disposed over the substrate in such a way as to be not overlapped.

5. The touch panel of claim 1, wherein the plurality of dummy electrodes are provided in the invalid area of the substrate.

6. The touch panel of claim 1, wherein the second one of the pen touch electrodes is between the first one of the detection electrodes and the third one of the pen touch electrodes,
wherein the third one of the pen touch electrodes is between the second one of the pen touch electrodes and the second one of the detection electrodes, and
wherein the second one of the detection electrodes is between the third one of the pen touch electrodes and the fourth one of the pen touch electrodes.

* * * * *